(12) United States Patent
Koike et al.

(10) Patent No.: US 9,830,539 B2
(45) Date of Patent: Nov. 28, 2017

(54) PRINTING SYSTEM AND CONTROL METHOD FOR A PRINTING DEVICE HAVING MULTIPLE COMMUNICATION INTERFACES

(71) Applicant: Seiko Epson Corporation, Tokyo (JP)

(72) Inventors: Toshiaki Koike, Shiojiri (JP); Norio Tsuchiya, Shiojiri (JP); Ryo Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/938,388

(22) Filed: Nov. 11, 2015

(65) Prior Publication Data

US 2016/0147490 A1    May 26, 2016

(30) Foreign Application Priority Data

| Nov. 20, 2014 | (JP) | 2014-235324 |
| Nov. 20, 2014 | (JP) | 2014-235325 |
| Nov. 20, 2014 | (JP) | 2014-235328 |
| Nov. 20, 2014 | (JP) | 2014-235368 |

(51) Int. Cl.
  *G06K 15/02*  (2006.01)
  *G06K 15/00*  (2006.01)

(52) U.S. Cl.
  CPC ..... *G06K 15/1817* (2013.01); *G06K 15/4045* (2013.01)

(58) Field of Classification Search
  None
  See application file for complete search history.

(56) References Cited

U.S. PATENT DOCUMENTS

| 5,630,030 | A | * | 5/1997 | Kawamura | G06K 15/00 |
| | | | | | 358/1.14 |
| 5,663,800 | A | * | 9/1997 | Ainai | G06F 3/1295 |
| | | | | | 358/1.16 |
| 6,028,985 | A | * | 2/2000 | Okuyama | G06F 3/1295 |
| | | | | | 358/1.15 |

(Continued)

FOREIGN PATENT DOCUMENTS

| EP | 1 587 039 A2 | 10/2005 |
| JP | 05-143256 A | 6/1993 |

(Continued)

*Primary Examiner* — Ming Hon
(74) *Attorney, Agent, or Firm* — Foley & Lardner LLP

(57) ABSTRACT

To use resources effectively and run appropriate processes in a configuration having multiple communication interfaces, a print control processor 201 switches a target buffer for processing data between a first receive buffer 24 that stores data received from a POS terminal 10, and a second receive buffer 26 that stores data received from a tablet terminal 13. The print control processor 201 controls a print mechanism 21 based on data stored in the receive buffer that is currently selected as the target buffer, changes the target buffer selection from the first receive buffer 24 to the second receive buffer 26 when control of the print mechanism 21 based on receipt print data stored in the first receive buffer 24 goes to a specific control state, and resets the target buffer selection to the first receive buffer 24 when control of the print mechanism based on the data stored in the second receive buffer 26 ends.

20 Claims, 7 Drawing Sheets

(56) References Cited

U.S. PATENT DOCUMENTS

| | | | | |
|---|---|---|---|---|
| 2002/0060808 A1* | 5/2002 | Henderson | ............ | G06Q 20/20 |
| | | | | 358/1.15 |
| 2005/0134899 A1 | 6/2005 | Inoue | | |
| 2005/0270565 A1* | 12/2005 | Shima | ................ | H04N 1/00915 |
| | | | | 358/1.15 |
| 2006/0221391 A1* | 10/2006 | Okazawa | ............. | G06F 3/1204 |
| | | | | 358/1.15 |
| 2008/0198404 A1* | 8/2008 | Saito | .................... | G06F 3/1213 |
| | | | | 358/1.15 |
| 2012/0105907 A1* | 5/2012 | Song | .................... | G06F 3/1203 |
| | | | | 358/1.15 |
| 2014/0368653 A1* | 12/2014 | Wang | ...................... | G06F 13/24 |
| | | | | 348/148 |

FOREIGN PATENT DOCUMENTS

| | | | |
|---|---|---|---|
| JP | 06-305204 | A | 11/1994 |
| JP | 10-312250 | A | 11/1998 |
| JP | 2004-195784 | A | 7/2004 |
| JP | 2006-150732 | A | 6/2006 |
| JP | 2008-110576 | A | 5/2008 |

\* cited by examiner

PRINTING SYSTEM AND CONTROL METHOD FOR A PRINTING DEVICE HAVING MULTIPLE COMMUNICATION INTERFACES

BACKGROUND

1. Technical Field

The present invention relates to a printing device and a printing system.

2. Related Art

JP-A-H10-312250 describes a printing device (image forming devices) that has multiple communication units (interfaces) and uses a separate processing program for each communication unit to process data received from plural of external devices through the plural communication units.

The processing programs must be written for each communication unit and stored in the printing device, and a task must be instantiated for each processing program, creating problems with efficient use of memory and processing resources. If an individual processing program is not written for each communication unit, a process compatible with configurations having plural communication units must be run.

SUMMARY

With the present invention, a printing device with multiple communication units/interfaces, and a printing system including the printing device, can efficiently use resources and can execute a common process that is compatible with configurations having plural communication units/interfaces.

One implementation of the present invention is a control method for a printing device, including: using a print mechanism to print on recording media; using a first communication interface to receive first data, and to store the received first data into a first receive buffer; using a second communication interface to receive second data, and to store the received second data into a second receive buffer; using a print control processor to control the print mechanism based on data stored in a designated target buffer; wherein: one of the first receive buffer and second receive buffer is alternately designated as the target buffer; if the first received buffer is currently designated as the target buffer, then changing the target buffer designation from the first receive buffer to the second receive buffer when control of the print mechanism based on first data stored in the first receive buffer reaches a specific control state, and if the second receive buffer is currently designated as the target buffer, then resetting the target buffer designation to the first receive buffer in response to control of the print mechanism based on second data stored in the second receive buffer ending.

Preferably in this method, if the first receive buffer is currently designated as the target buffer and second data is stored to the second receive buffer, then changing the target buffer designation to the second receive buffer after the elapse of a predefined non-zero time period that follows after control of the print mechanism based on first data stored in the first receive buffer ends.

Alternatively, if the first receive buffer is currently designated as the target buffer and second data containing plural commands is stored to the second receive buffer, then changing the target buffer designation to the second receive buffer after control of the print mechanism based on a specific command included in the first data stored in the first receive buffer ends.

The method may further include: monitoring if there is a status change in the printing device; generating status data including the status that changed when there is a status change; and if the first communication interface and the second communication interface are both actively coupled to respective external devices, then sending the generated status data to only one of the first communication interface or the second communication interface for transmission to one respective external device.

Preferably, the method further includes setting either the first receive buffer or the second receive buffer as a main buffer and the other as a secondary buffer in a specific situation;

maintaining the main buffer as the target buffer while data is not stored in the secondary buffer; and when data is stored to the secondary buffer, changing the target buffer designation to the secondary buffer and executing a secondary process based on data stored in the secondary buffer; and when execution of the secondary processing ends, changing the target buffer designation back to the main buffer.

In this case, one of the first communication interface and second communication interface is configured to start receiving data first upon the printing device turning on, the method further including setting as the main buffer the receive buffer corresponding to the first or second communication interface that is configured to start receiving data first upon the printing device turning on.

Preferably, one of the first communication interface or second communication interface has a higher priority than the other, the method further including setting as the main buffer, the receive buffer corresponding to whichever of the first communication interface or second communication interface has the higher priority.

Preferably, upon the printing device turning on, setting as the main buffer, whichever of the first receive buffer or second receive buffer was the designated main buffer immediately before the printing device was last turned off.

Further preferably, one of the first communication interface and second communication interface is a wired communication interface and the other communication interface is a wireless communication interface, and the method further includes setting the receive buffer corresponding to the communication interface that is a wired communication interface as the main buffer.

Optionally, the method may include controlling the print mechanism using a printer settings file based on data stored in the receive buffer that is currently designated as the target buffer; changing the printer settings file when the target buffer designation changes from one receive buffer to the other.

In this case, the second data that the second receive buffer receives includes a rewrite-settings-file command to rewrite the printer settings file, and the control method may further include: rewriting the printer settings file based on the rewrite-settings-file command when the target buffer changes from the first receive buffer to the second receive buffer, and controlling the print mechanism based on data stored in the second receive buffer using the rewritten printer settings file.

Preferably image settings related to an image printed on the recording medium, and operating settings related to operation of the printing device when printing on the recording medium, are recorded in the printer settings file. The control method may further include resetting the image settings of the printer settings file and rewriting the image settings based on the rewrite-settings-file command, and not rewriting the operating settings of the printer setting file, when the target buffer designation changes from the first receive buffer to the second receive buffer.

The present invention may also be implemented in a control method for a printing system, including: using a POS terminal to send first data for producing a receipt to a printing device; using a control device to send second data for producing a ticket printed with specific information to the printing device; the printing device having a print mechanism to print on a recording medium, a cutter to cut the recording medium to produce the receipt or the ticket, a first communication interface to exchange data with the POS terminal, a first receive buffer configured to store first data received by the first communication interface, a second communication interface to exchange data with the control device, and a second receive buffer configured to store second data received by the second communication interface; wherein the printing device controls the print mechanism based on data stored in a designated target buffer, and one of the first receive buffer and second receive buffer is alternately designated as the target buffer; and wherein the control method includes the printing device implementing the following steps: if the first received buffer is currently designated as the target buffer, then changing the target buffer designation from the first receive buffer to the second receive buffer when control of the print mechanism based on first data stored in the first receive buffer goes to a specific control state; and if the second receive buffer is currently designated as the target buffer, then resetting the target buffer designation to the first receive buffer in response to control of the print mechanism based on second data stored in the second receive buffer ending.

Preferably, if the first receive buffer is currently designated as the target buffer and second data is stored to the second receive buffer, then the printing device changing the target buffer designation to the second receive buffer after the elapse of a predefined non-zero time period that follows after control of the print mechanism based on first data stored in the first receive buffer ends.

Further preferably, if the first receive buffer is currently designated as the target buffer and second data containing plural commands is stored to the second receive buffer, then the printing device changing the target buffer designation to the second receive buffer after control of the print mechanism based on a specific command included in the first data stored in the first receive buffer ends.

In the present method, the printing device may implement the following steps: monitoring if there is a status change in the printer; generating status data including the status that changed when there is a status change; and if the first communication interface is actively coupled to the POS terminal and the second communication interface is actively coupled to the control device, then sending the generated status data to only one of the first communication interface or the second communication interface for transmission to their respectively coupled POS terminal or control device.

Optionally, if the POS terminal newly receives a status data bit from the first communication interface of the printing device, the POS terminal determines what status of the printing device changed based on the newly received status data bit and a previously received status data bit.

In the method, the printing device may further implement the following steps: controlling the print mechanism using a printer settings file based on data stored in the receive buffer that is currently designated as the target buffer; changing the printer settings file when the target buffer designation changes from one receive buffer to the other.

In this case, the second data that the second receive buffer of the printing device receives includes a rewrite-settings-file command to rewrite the printer settings file, the control method further including the printing device implementing the following steps: rewriting the printer settings file based on the rewrite-settings-file command when the target buffer designation changes from the first receive buffer to the second receive buffer, and controlling the print mechanism based on data stored in the second receive buffer using the rewritten printer settings file.

The present invention may also be achieved as a printing device including: a print mechanism configured to print on a recording medium; a first communication interface configured to receive first data, and to store the received first data into a first receive buffer; a second communication interface configure to receive second data, and to store the received second data into a second receive buffer; and a print control processor configured to control the print mechanism based on data stored in a designated target buffer; wherein: one of the first receive buffer and second receive buffer is alternately designated as the target buffer; if the first received buffer is currently designated as the target buffer, then the target buffer designation is changed from the first receive buffer to the second receive buffer when control of the print mechanism based on first data stored in the first receive buffer reaches a specific control state; and if the second receive buffer is currently designated as the target buffer, then the target buffer designation is reset to the first receive buffer in response to control of the print mechanism based on second data stored in the second receive buffer ending.

One aspect of the invention is a control method of a printing device having a print unit configured to print on recording media, a first communication unit configured to receive data, a first receive buffer configured to store data received by the first communication unit, a second communication unit configured to receive data, and a second receive buffer configured to store data received by the second communication unit, the control method including: switching the target buffer for processing between the first receive buffer and the second receive buffer; controlling the print unit based on data stored in the buffer set as the target buffer; and changing the target buffer from the first receive buffer to the second receive buffer when the target buffer is the first receive buffer and control of the print unit based on data stored in the first receive buffer goes to a specific state, and resetting the target buffer to the first receive buffer when control of the print unit based on data stored in the second receive buffer ends.

Thus comprised, a printing device having plural communication units can use resources effectively and execute processes appropriate to a configuration having multiple communication units.

When the target buffer is the first receive buffer and data is stored to the second receive buffer, a control method according to another aspect of the invention preferably changes the target buffer to the second receive buffer when a specific time passes after control of the print unit based on data stored in the first receive buffer ends.

This configuration enables changing the target buffer from the first receive buffer to the second receive buffer after reliably finishing processing based on data stored in the first receive buffer.

When the target buffer is the first receive buffer and data containing plural commands is stored to the second receive buffer, a control method according to another aspect of the invention preferably changes the target buffer to the second receive buffer after control of the print unit based on a specific command included in the data stored in the first receive buffer ends.

This aspect of the invention improves processing efficiency and shortens the processing time.

A control method according to another aspect of the invention preferably includes monitoring if there is a status change in the printing device; generating status data including the status that changed when there is a status change; and sending the generated status data to the first communication unit or the second communication unit.

Thus comprised, the printing device can execute processes appropriate to a configuration having multiple communication units.

A control method according to another aspect of the invention preferably also includes setting either the first receive buffer or the second receive buffer as a main buffer and the other as a secondary buffer in a specific situation; maintaining the main buffer as the target buffer while data is not stored in the secondary buffer when the target buffer is the main buffer; and when data is stored to the secondary buffer, changing the target buffer to the secondary buffer and executing a process based on data stored in the secondary buffer; and when processing ends, changing the target buffer to the main buffer.

Thus comprised, the printing device can execute processes appropriate to a configuration having multiple communication units.

A control method according to another aspect of the invention preferably includes setting as the main buffer the buffer corresponding to whichever of the first communication unit and second communication unit is the communication unit configured to start receiving data first.

This aspect of the invention improves user convenience when setting one of the communication units as the main buffer.

A control method according to another aspect of the invention preferably includes setting as the main buffer the buffer corresponding to whichever of the first communication unit and second communication unit is the communication unit configured to be first able to receive data first.

This aspect of the invention improves user convenience when setting one of the communication units as the main buffer.

A control method according to another aspect of the invention preferably includes setting as the main buffer whichever of the first receive buffer and second receive buffer is the previously specified receive buffer.

This aspect of the invention improves user convenience when setting one of the communication units as the main buffer.

A control method according to another aspect of the invention preferably includes setting the buffer corresponding to the communication unit configured to receive data by wired communication as the main buffer when one of the first communication unit and the second communication unit is a communication unit configured to receive data by wired communication and the other is a communication unit configured to receive data by wireless communication.

This aspect of the invention improves user convenience when setting one of the communication units as the main buffer.

A control method according to another aspect of the invention preferably includes controlling the print unit using a settings file based on data stored in the buffer set as the target buffer; resetting the settings file when the target buffer changes from the first receive buffer to the second receive buffer; and restoring the settings file when the target buffer changes from the second receive buffer to the first receive buffer.

Thus comprised, a printing device having plural communication units can use resources effectively and execute processes appropriate to a configuration having multiple communication units.

In a control method according to another aspect of the invention, data the second receive buffer receives includes a rewrite settings file command to rewrite the settings file; and the control method further includes rewriting the settings file based on the rewrite settings file command when the target buffer changes from the first receive buffer to the second receive buffer, and controlling the print unit based on data stored in the second receive buffer using the rewritten settings file.

When processing data stored in the second receive buffer, this aspect of the invention can process the data after rewriting the settings file.

In a control method according to another aspect of the invention, image settings related to an image printed on the recording medium, and operating settings related to operation when printing on the recording medium, are recorded in the settings file; and the control method further includes resetting the image settings of the settings file and rewriting the image settings based on the rewrite settings file command, and not rewriting the operating settings, when the target buffer changes from the first receive buffer to the second receive buffer.

This aspect of the invention enables processing based on data stored in the first receive buffer, and processing data stored in the second receive buffer, using the same operating settings.

Another aspect of the invention is a control method of a printing system including a POS (Point Of Sale) terminal configured to send data for producing a receipt, a control device configured to send data for producing a ticket (a form) printed with specific information, and a printing device having a print unit configured to print on a recording medium, cuts the recording medium, and produces the receipt or the ticket, a first communication unit configured to exchange data with the POS terminal, a first receive buffer configured to store data received by the first communication unit, a second communication unit configured to exchange data with the control device, and a second receive buffer configured to store data received by the second communication unit. The control method causes the printing device to: switch the target buffer for processing between the first receive buffer and the second receive buffer; control the print unit based on data stored in the buffer set as the target buffer; change the target buffer from the first receive buffer to the second receive buffer when the target buffer is the first receive buffer and control of the print unit based on data stored in the first receive buffer goes to a specific state; and reset the target buffer to the first receive buffer when control of the print unit based on data stored in the second receive buffer ends.

In a printing system including a printing device having plural communication units, this aspect of the invention enables using resources effectively and executing processes appropriate to a configuration having plural communication units.

In the control method of a printing system according to another aspect of the invention, when the target buffer is the first receive buffer and data is stored to the second receive buffer, the printing device changes the target buffer to the second receive buffer when a specific time passes after control of the print unit based on data stored in the first receive buffer ends.

This configuration enables changing the target buffer from the first receive buffer to the second receive buffer after reliably finishing processing based on data stored in the first receive buffer.

In the control method of a printing system according to another aspect of the invention, when the target buffer is the first receive buffer and data containing plural commands is stored to the second receive buffer, the printing device changes the target buffer to the second receive buffer after control of the print unit based on a specific command included in the data stored in the first receive buffer ends.

This aspect of the invention improves processing efficiency and shortens the processing time.

The control method of a printing system according to another aspect of the invention further includes: the printing device monitoring if there is a status change in the printing device; generating status data including the status that changed when there is a status change; and sending the generated status data to the first communication unit or the second communication unit.

The printing system in this aspect of the invention can execute processes appropriate to a configuration in which the printing device has plural communication units.

The control method of a printing system according to another aspect of the invention further includes: when one status data unit is received from the first communication unit of the printing device, the POS terminal acquiring what state of the printing device changed based on the one status data unit received and the status data unit received before the one status data unit.

In this aspect of the invention, a first control device can use status data to appropriately determine that the printer status has changed and the changed status.

The control method of a printing system according to another aspect of the invention further includes: the printing device controlling the print unit using a settings file based on data stored in the buffer set as the target buffer; resetting the settings file when the target buffer changes from the first receive buffer to the second receive buffer; and restoring the settings file when the target buffer changes from the second receive buffer to the first receive buffer.

This aspect of the invention enables using resources effectively to execute processes appropriate to a configuration having multiple communication units in a printing system including a printing device with plural communication units.

In the control method of a printing system according to another aspect of the invention, data the second receive buffer of the printing device receives includes a rewrite settings file command to rewrite the settings file; and the control method includes the printing device rewriting the settings file based on the rewrite settings file command when the target buffer changes from the first receive buffer to the second receive buffer, and controlling the print unit based on data stored in the second receive buffer using the rewritten settings file.

When processing data stored in the second receive buffer, this aspect of the invention can process the data after rewriting the settings file.

Another aspect of the invention is a printing device including a print unit configured to print on a recording medium; a first communication unit configured to receive data; a first receive buffer configured to store data received by the first communication unit; a second communication unit receives data; a second receive buffer configured to store data received by the second communication unit; and a print control unit configured to switch a target buffer for processing between the first receive buffer and the second receive buffer; controls the print unit based on data stored in the buffer set as the target buffer; changes the target buffer from the first receive buffer to the second receive buffer when the target buffer is the first receive buffer and control of the print unit based on data stored in the first receive buffer goes to a specific state; and resets the target buffer to the first receive buffer when control of the print unit based on data stored in the second receive buffer ends.

Thus comprised, a printing device having plural communication units can use resources effectively and execute processes appropriate to a configuration having multiple communication units.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

Figure 1:
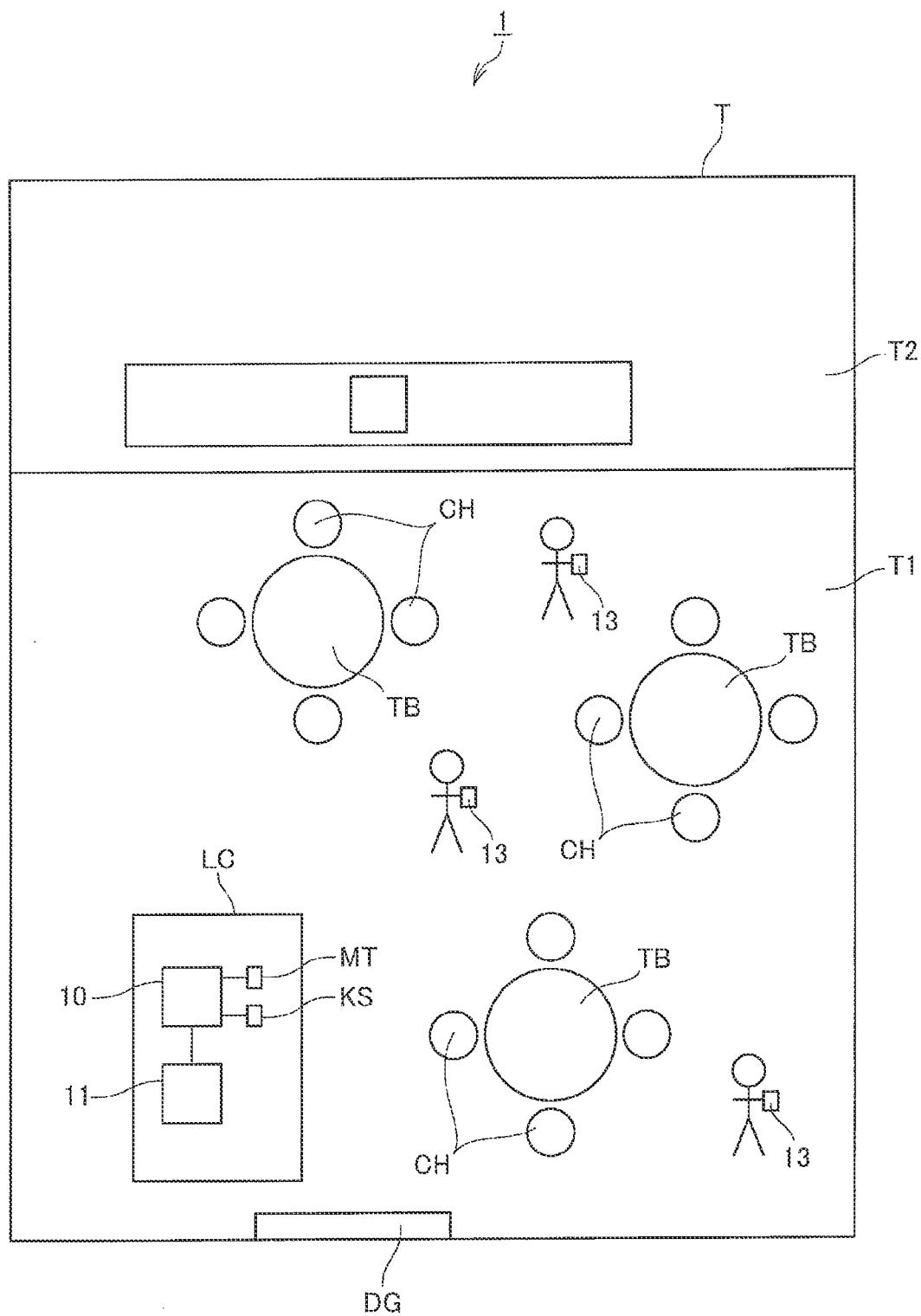
FIG. 1 illustrates a configuration of a printing system according to a preferred embodiment of the invention.

FIG. 1 illustrates a configuration of a printing system 1 according to an embodiment of the present invention deployed in a restaurant T.

In FIG. 1, the exemplary restaurant T preferably serves food and drinks to customers.

The restaurant T shown in FIG. 1 is preferably divided into a dining room T1 and a kitchen T2.

The dining room T1 is where customers of the restaurant T sit, and where wait staff (referred to below as waiters) serve food and drinks to customers in the dining room T1. Plural waiters may work in the dining room T1. The dining room T1 preferably includes multiple tables TB where food and drinks can be placed. Multiple chairs CH, where customers sit, may be placed at each table TB.

In the present example, a checkout counter LC, where customers pay for their service, is located near an exit DG from the dining room T1. A POS (Point Of Sale) terminal 10 and a printer 11, which may be connected by wire to POS terminal 10, are installed at the checkout counter LC. Devices that may be connected to the POS terminal 10 include a monitor MT and a cash drawer KS.

A waiter inputs information to the POS terminal 10 to process a customer payment (e.g., as part of a transaction, such as for goods and/or services, i.e., a "commercial transaction"). The POS terminal 10 controls the monitor MT and the cash drawer KS in accordance with the input information to display information related to the transaction on the monitor MT and make change as needed using the cash drawer KS. The POS terminal 10 also controls the printer 11 and causes the printer 11 to produce a receipt (i.e., transaction receipt or sales receipt). The receipt produced by the printer 11 may then be given to the customer.

A tablet terminal 13 (control device) used to take customer orders is previously assigned to each of the plural waiters. Each tablet terminal 13 is a tablet computer, preferably having a touch panel 41 on its front.

To place an order from a customer in the dining room T1, a waiter goes to the customer, takes the order, and inputs the order to the tablet terminal 13. Once the order has been received (i.e., entered), the waiter goes to the checkout counter LC (or goes to within a known vicinity of the checkout counter LC and/or printer 11) and the tablet terminal 13 connects wirelessly to the printer 11, preferably using a Bluetooth (R) wireless connection. The waiter then makes a specific input to the tablet terminal 13. In response to this specific input, the tablet terminal 13 controls the printer 11 to produce an order ticket showing at least the name of each ordered item and the quantity ordered. The waiter then places the order ticket produced by the printer 11 at a specific place in the kitchen T2. It is to be understood that printer 11, or a second such printer 11, may be located near the specific place in the kitchen T2. If a second such printer 11 is used, then the second such printer 11 may be used to print/produce the order ticket.

The kitchen T2 is the area where the ordered items are prepared by workers in the kitchen T2 ("kitchen staff" below). Preferably, the kitchen T2 has a drink machine, stove, refrigerator, and other appliances. The kitchen staff takes the order ticket placed at the specific position by the waiter, and checks and prepares the ordered menu items based on the order ticket. The kitchen staff then passes the prepared items to the waiter, who delivers the prepared items to the customer.

The POS terminal 10 is preferably continuously connected to the printer 11 by USB or other wired connection, and communicates by wire with the printer 11.

Each tablet terminal 13 connects temporarily by Bluetooth or other wireless connection to the printer 11, and communicates wirelessly with the printer 11.

The printer 11 according to this embodiment produces receipts as controlled by the POS terminal 10, and produces order tickets as controlled by each tablet terminal 13.

Figure 2:
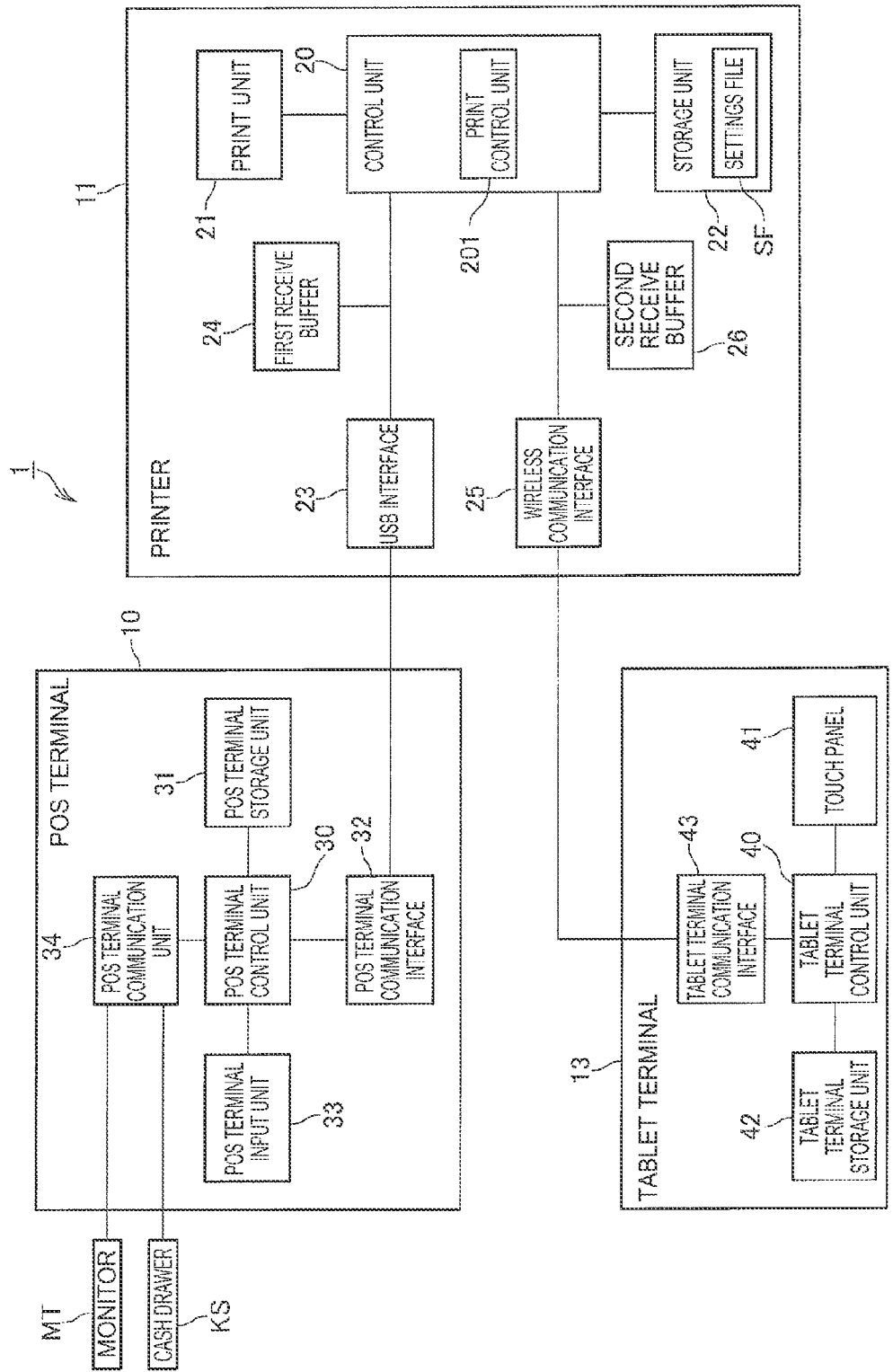
FIG. 2 is a block diagram showing a functional configuration of devices in a printing system in accord with the present invention.

FIG. 2 is a block diagram showing preferred functional configurations of devices in the printing system 1.

The printer 11 may be a line thermal printer that holds roll paper (recording media) and prints images by forming dots on thermal roll paper by a thermal line head.

The printer 11 shown in FIG. 2 has a control unit 20, print unit 21, storage unit 22, a USB interface 23 (first communication unit), first receive buffer 24, wireless communication interface 25 (second communication unit), and second receive buffer 26. It is to be understood that control unit 20 (or print control unit) may be an electronic/digital controller or control processing circuit (e.g. control processor or specialized data processor/processing circuit or central processing circuit), the print unit 21 may be a print (ing) mechanism or print (ing) assembly including any component(s) used in the transferring/forming of an image (i.e., print) onto a medium (such as ink cartridge carrier, ink cartridge moving arm, drive mechanism, etc.), storage unit 22 may be a designated (electronic) memory space, and the first communication unit may be a transmitter, receiver, transponder or any wired communication interface.

The control unit 20 includes a CPU, ROM, RAM, and other peripheral circuits, and controls the printer 11. The control unit 20 functions as a print control unit 201 by reading and running a specific control program from ROM. The print control unit 201 is described further below.

The print unit 21 includes a conveyance mechanism that conveys the roll paper stored inside a case of the printer 11, a print mechanism that forms dots and prints images on the roll paper with a thermal head, and a cutter mechanism that cuts the roll paper at a specific position. The print unit 21 prints on the roll paper with the print mechanism while conveying the roll paper with the conveyance mechanism, and then cuts the roll paper at the specific position by use of the cutter mechanism to produce the receipts and order tickets described above as controlled by the control unit 20.

The storage unit 22 has flash ROM or other nonvolatile memory, and stores data. The storage unit 22 stores a settings file SF. The settings file SF is described further below.

The USB interface 23 has an interface board with a USB port, and communicates with the POS terminal 10 through a USB cable connected to the USB port as controlled by the control unit 20 according to a known USB protocol.

The first receive buffer 24 is a buffer that stores the data the USB interface 23 receives from the POS terminal 10.

The wireless communication interface 25 includes a wireless communication module with a wireless communication capability, preferably conforming to the Bluetooth standard. The wireless communication interface 25 communicates wirelessly with each tablet terminal 13 as controlled by the control unit 20 according to the Bluetooth standard.

The second receive buffer 26 is a buffer that stores the data the wireless communication interface 25 receives from each tablet terminal 13.

The POS terminal 10 is a host computer that controls the printer 11.

As shown in FIG. 2, the POS terminal 10 has a POS terminal control unit 30, POS terminal storage unit 31, POS terminal communication interface 32, POS terminal input unit 33, and a POS terminal communication unit 34. It is to be understood that the POS terminal control unit 30 may be a controller or data processor, POS terminal storage unit 31 is a designated memory space in an electronic memory, POS terminal input unit 33 may be any type of data input device (preferably user input device) such as a computer keyboard and/or mouse, and POS terminal communication unit 34 may be any type of communication interface for communicating with periphery devices.

The POS terminal control unit 30 has a CPU, ROM, RAM, and other peripheral circuits, and controls the POS terminal 10.

The POS terminal storage unit 31 has nonvolatile memory, and stores data.

The POS terminal communication interface 32 communicates (preferably by use of wired communication) with the printer 11 as controlled by the POS terminal control unit 30 (preferably in accordance with the known USB protocol).

The POS terminal input unit 33 preferably includes a keypad and/or operating switches. The POS terminal input unit 33 detects user inputs and forwards the detected user inputs to the POS terminal control unit 30. The POS terminal control unit 30 executes processes appropriate to (i.e., in accordance with) the received user inputs.

The POS terminal communication unit 34 communicates with devices connected to the POS terminal 10, as controlled by the POS terminal control unit 30. Examples of devices connected to the POS terminal 10 include monitor MT and cash drawer KS.

The monitor MT preferably has a display unit such as an LCD panel, and displays images on the display unit as controlled by the POS terminal control unit 30.

The cash drawer KS preferably has a tray for storing cash, a drawer mechanism that pulls the tray out from a cabinet, and a lock mechanism that locks the tray in the cabinet. The cash drawer KS selectively unlocks the lock mechanism and pulls the tray out from the cabinet using the drawer mechanism as controlled by the POS terminal control unit 30.

The tablet terminal 13 is a tablet computer with a touch panel 41 on the front.

As shown in FIG. 2, the tablet terminal 13 includes a tablet terminal control unit 40, touch panel 41, tablet terminal storage unit 42, and a tablet terminal communication interface 43. It is to be understood that tablet terminal control unit 40 may be a controller or a data processor, and tablet terminal storage unit 42 is an electronic memory.

The tablet terminal control unit 40 includes a CPU, ROM, RAM, and other peripheral circuits, and controls the tablet terminal 13.

The touch panel 41 includes an LCD panel or other type of display panel, and a touch sensor disposed over the display panel. The touch panel 41 displays images on the display panel as controlled by the tablet terminal control unit 40. The touch sensor detects touch operations and outputs to the tablet terminal control unit 40. The tablet terminal control unit 40 executes processes appropriate to the touch operation based on the input from the touch panel 41.

The tablet terminal storage unit 42 includes flash ROM or other nonvolatile memory, and stores data.

The tablet terminal communication interface 43 communicates with the printer 11 by wireless Bluetooth communication as controlled by the tablet terminal control unit 40.

The operation of the POS terminal 10 (column (A) in the flow chart of FIG. 3) and the printer 11 (column (B) in the flow chart of FIG. 3) when producing a receipt is described next with reference to the flow chart in FIG. 3.

In one embodiment of the invention as described further below, processing alternately uses the first receive buffer 24 and the second receive buffer 26. The printer 11 executes the process for producing a receipt when the first receive buffer 24 is used, and executes the process for producing an order ticket when the second receive buffer 26 is used. For brevity since the following description using the flow chart in FIG. 3 describes the execution of the process for producing a receipt, it is assumed that the first receive buffer 24 remains continuously selected for use during the execution of the process of FIG. 3.

As described above, when processing a customer transaction (i.e., commercial transaction) at the checkout counter LC, the waiter uses a keypad or other input device of the POS terminal 10 to input the relevant transaction information. Based on the input transaction information, the POS terminal 10 controls the monitor MT and cash drawer KS to display transaction-related information on the monitor MT, and to receive payment and make change using the cash drawer KS.

The POS terminal control unit 30 of the POS terminal 10 executes a payment process according to the customer transaction, and generates control data (receipt print data) instructing producing a receipt based on the payment process (step SA1).

More specifically, the function blocks of the POS terminal 10 include a POS application execution unit that runs a POS application, and a printer driver execution unit that runs a printer driver.

More specifically, the POS application execution unit generates receipt information containing information to record on the receipt according to the customer's transaction. The receipt information is information including, for example, information related to a logo printed on the receipt; when the receipt is printed (date and time); information related to the names, prices, quantities, and applicable tax for products/services the customer purchased; the purchase total; the amount received from the customer; the amount of change due; or other information. The POS application execution unit determines the receipt information based on the input information provided by the waiter using the keypad or other input device. After generating the receipt information, the POS application execution unit outputs the receipt information to the printer driver execution unit.

The printer driver execution unit generates receipt print data in the command language of the printer 11 based on the received receipt information. The receipt print data is data comprising plural control commands in the command language of the printer 11.

After generating the receipt print data, the POS terminal control unit 30 controls the POS terminal communication interface 32 to send the generated receipt print data to the printer 11 (step SA2).

Figure 3:
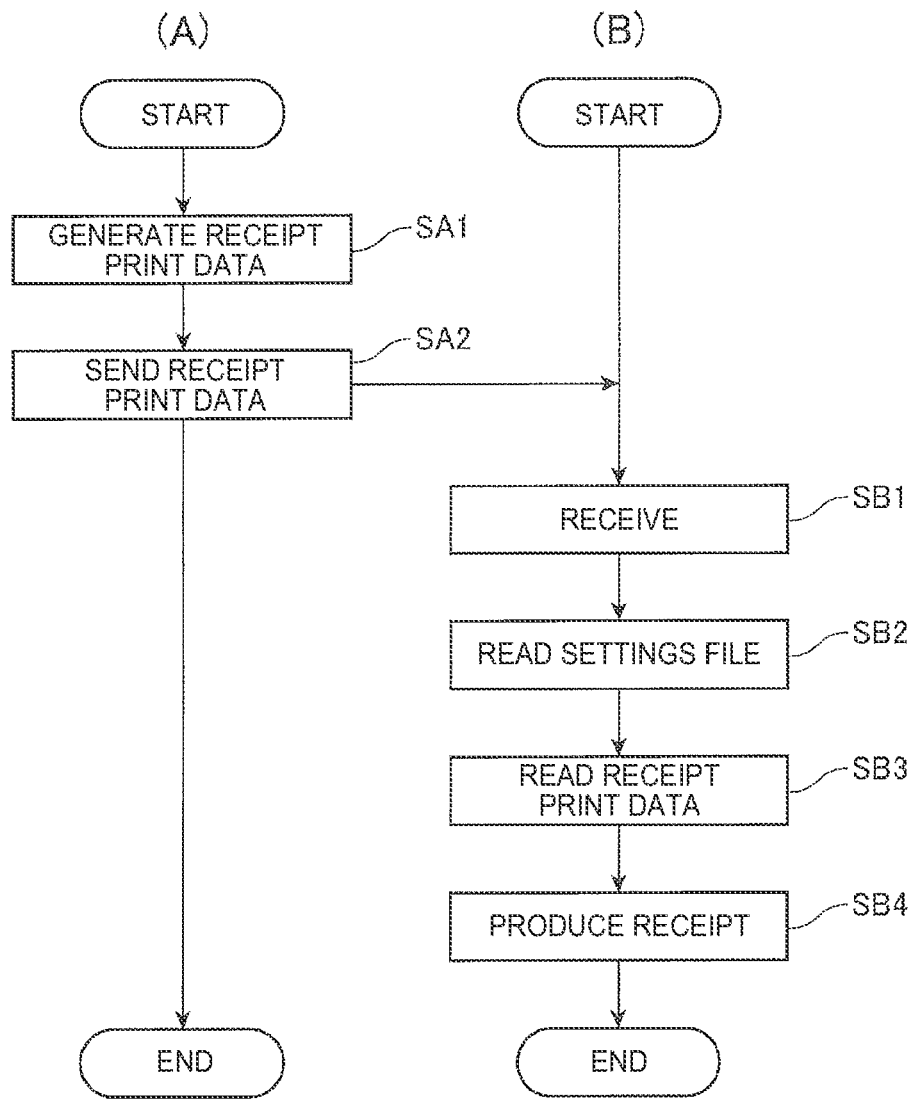
FIG. 3 is a flow chart showing an operation of a POS terminal and the printing device in accord with the present invention.

As shown in column (B) of FIG. 3, the USB interface 23 of the printer 11 receives and stores the receipt print data in the first receive buffer 24 (step SB1).

The print control unit 201 of the control unit 20 then references the settings file SF stored in the storage unit 22 (step SB2).

The settings file SF contains multiple sets of parameters, and contains the values to which those parameters are to be set (referred to below as simply "settings").

For example, types of settings include image settings and operating settings.

The image settings contain information that affects the appearance of the final image printed on the recording medium. Examples of such image settings include left margin, right margin, top margin, bottom margin, font face, and line spacing.

The image settings are previously stored by a specific method according to a desire print layout of the receipt.

The operating settings include information that affect printer operation when printer 11 is running a printing process. Examples of the operating settings include the print density and the printing speed.

The information contained in the settings file SF can be changed by the user at any time using a specific method.

After referencing the settings file SF, the print control unit 201 reads the receipt print data stored in the first receive buffer 24 (step SB3).

Next, the print control unit 201 controls the print unit 21 to produce a receipt based on the read receipt print data according to the settings (image settings and operating settings) recorded in the settings file SF (step SB4).

The operation of the tablet terminal 13 (column(A) in the flow chart of FIG. 4) and the printer 11 (column (B) in the flow chart of FIG. 4) when producing an order ticket is described next with reference to the flow chart of FIG. 4.

In one embodiment of the invention as described further below, processing alternately uses the first receive buffer 24 and second receive buffer 26. The printer 11 executes the process for producing an order ticket when the second receive buffer 26 is used, and executes the process for producing a receipt when the first receive buffer 24 is used. For brevity since the following description using the flow chart in FIG. 4 describes the execution of the process for producing an order ticket, it is assumed that the second receive buffer 26 remains continuously selected for use during the execution of the process of FIG. 4.

A specific native application is pre-installed in the tablet terminal 13. Below, the functions of the tablet terminal control unit 40 of the tablet terminal 13 are preferably embodied by the native application and associated programs.

As described above, the waiter receives an order from a customer, and inputs the order content through a specific user interface provided by a function of the native application. After receiving the order, the waiter goes near the checkout counter LC (i.e., within Bluetooth communication range of printer 11), and the tablet terminal 13 and printer 11 connect wirelessly by Bluetooth. When connecting wirelessly, the tablet terminal 13 and printer 11 are paired according to the Bluetooth protocol known in the art, a communication link is established therebetween, and the devices can exchange data. After the tablet terminal 13 and printer 11 connect wirelessly, the waiter enters a specific input via the user interface of the tablet 13.

The tablet terminal control unit 40 generates control data ("order ticket print data" below) instructing printing an order ticket in response to the entered specific input (step SC1).

As described above, an order ticket is a ticket on which at least the name and quantities of the ordered items are printed. The native application includes the POS application described above, and a program with the same functionality as the printer driver (e.g. a second printer driver). The tablet terminal control unit 40 generates the order ticket print data by a function of the native application.

The order ticket print data is data comprising plural control commands in the command language of the printer 11. More specifically, the first control command in the order ticket print data is a rewrite settings file command. The rewrite settings file command is described further below.

After generating the order ticket print data, the tablet terminal control unit 40 controls the tablet terminal communication interface 43 to send the order ticket print data to the printer 11 (step SC2).

Figure 4:
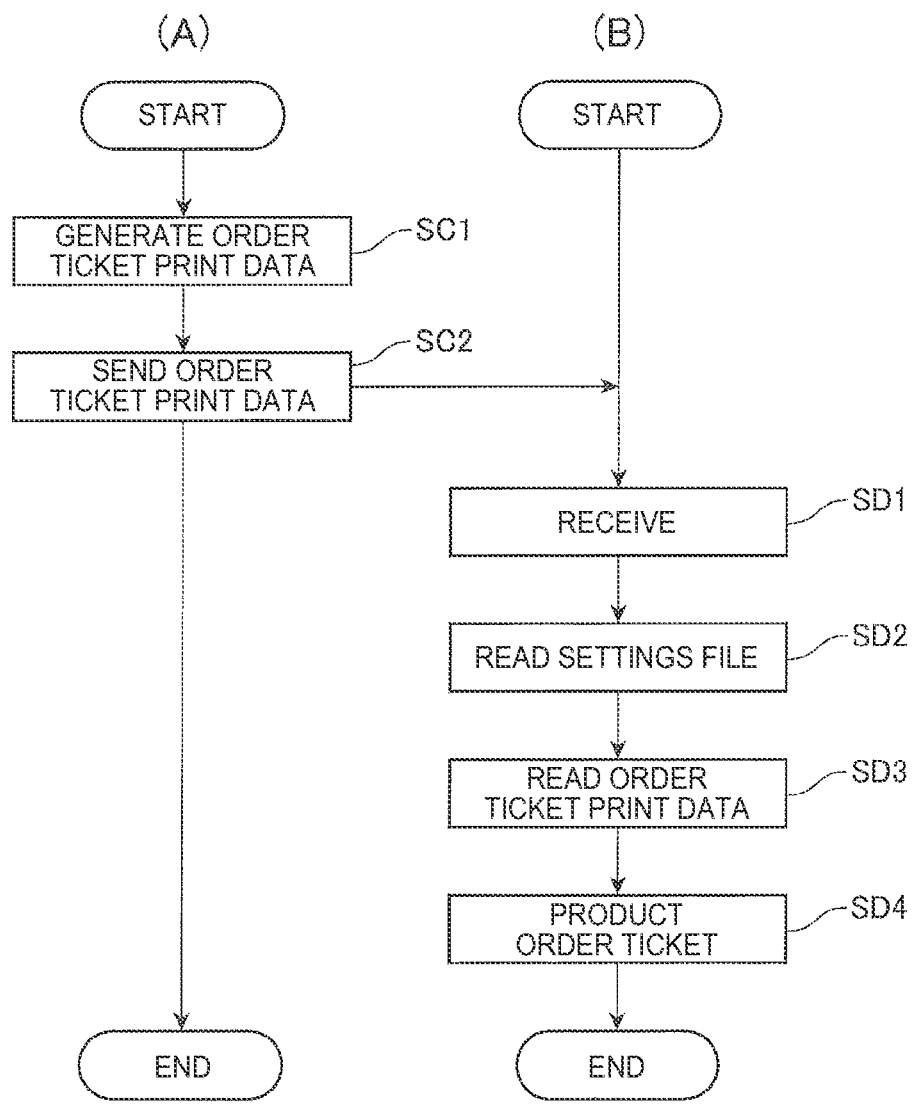
FIG. 4 is a flow chart showing an operation of a tablet terminal and the printing device in accord with the present invention.

As shown in FIG. 4, column (B), the wireless communication interface 25 of the printer 11 receives and stores the order ticket print data in the second receive buffer 26 (step SB1).

The print control unit 201 of the control unit 20 then references the settings file SF stored in the storage unit 22 (step SD2).

Next, after referencing the settings file SF, the print control unit 201 reads the order ticket print data stored in the second receive buffer 26 (step SD3).

Next, the print control unit 201 controls the print unit 21 to produce an order ticket based on the read order ticket print data according to the settings (image settings and operating settings) recorded in the settings file SF (step SD4).

The system ("POS system" below) comprising the POS terminal 10 and printer 11 in the restaurant T is a pre-existing system where transactions were processed using the POS system. In systems not using the present invention, the order tickets were previously created by the waiter writing the order information on paper media by hand. By contrast, the printing system 1 according to this embodiment of the invention reduces the work load of the wait staff by having the printer 11 print the order tickets in addition to receipts.

The work load of the wait staff can conceivably be reduced by installing a new dedicated device with the ability to produce tickets in the restaurant T, and using this dedicated device to produce order tickets. However, because this configuration requires a dedicated device, the cost of the system increases.

By enabling the printer 11 to produce both receipts and order tickets, this embodiment of the invention prevents cost increases due to providing a dedicated device for producing order tickets. However, this creates the following problems and needs.

More specifically, because the POS system is an existing system, it is desirable to minimize the modifications of the POS terminals 10 in the POS system, including modifying the installed POS application program and modifying the printer driver program. Modifying the POS terminals 10 creates work to implement the changes, and increases the work load on the system administrator.

An existing POS system is a system in which there is a continuous one-to-one connection between the POS terminal 10 and the printer 11. Producing order tickets using the printer 11 under control of the tablet terminal 13 while sustaining the ability of the POS terminal 10 to control printing receipts on the printer 11 is therefore desirable, and may be necessary. Furthermore, the image settings recorded in the settings file SF of the printer 11 relate to the layout of the receipt and are not necessarily related, or applicable, to the layout of order tickets, and a process for handling these different settings is therefore desirable, and may be required.

Furthermore, because existing printers 11 are used, it is necessary to use the storage resources and computing resources of the printer 11 effectively instead of needing to increase the storage capacity of the printer 11 or replace the CPU with a more powerful CPU.

To solve these problems and needs, the printer 11 according to this embodiment of the invention executes the process described below.

Figure 5:
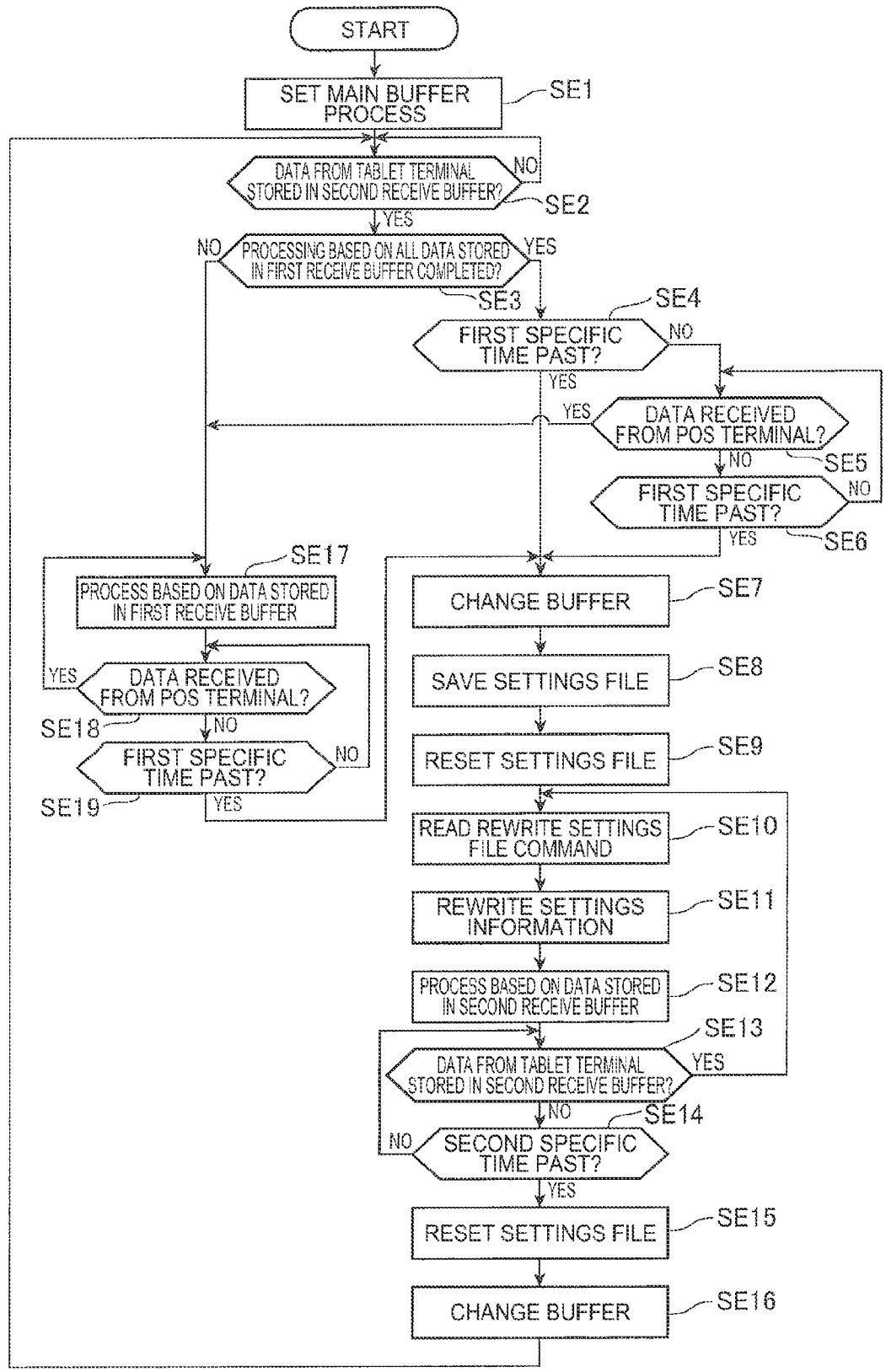
FIG. 5 is a flowchart showing an operation of the printing device in accord with the present invention.

FIG. 5 is a flow chart describing the operation of the printer 11 after it turns on.

As shown in FIG. 5, the printer 11 executes a set main buffer process after the power turns on (step SE1).

The set main buffer process is described below.

As described above, the print control unit 201 of the control unit 20 of the printer 11 switches the target buffer between the first receive buffer 24 and second receive buffer 26, and executes processes based on the data stored in the selected target buffer. When switching the buffer, the print control unit 201 sets the buffer (the first receive buffer 24 in this example) that stores the data received by the interface (communication unit; the USB interface 23 in this example) that connects to the POS terminal 10 as the main buffer (i.e., default buffer or default target buffer or default receive buffer), and sets the other buffer (the second receive buffer 26 in this example) as the secondary buffer. Thereafter, the print control unit 201 uses the buffer set as the main buffer (the first receive buffer 24 in this example) as the target buffer for data processing, temporarily switches the target buffer to the secondary buffer when data is stored to the buffer set as the secondary buffer (the second receive buffer 26 in this example), and switches (returns) the target buffer to the main buffer after the process based on the data stored in the secondary buffer ends.

The set main buffer process of step SE1 is the process that sets the first receive buffer 24 (the buffer that stores data received through the interface connected to the POS terminal 10) as the main buffer.

Setting the first receive buffer 24 as the main buffer has the following advantages.

As will be understood below, when the printer 11 prints a receipt based on the receipt print data received from the POS terminal 10, there is no need to change the settings file based on a rewrite settings file command. The POS terminal 10 therefore does not need to send a rewrite settings file command to the printer 11.

As will also be understood below, the rewrite settings file command is a command that is sent from the tablet terminal 13 to the printer 11 because there are two buffers, the first receive buffer 24 and the second receive buffer 26, and when processing data stored in one of the buffers, processing is based on the one settings file appropriate to that buffer. The POS terminal 10 therefore does not send a rewrite settings file command to the printer 11 in the existing POS system because there is only one buffer and a single settings file is sufficient. Also, by setting the first receive buffer 24 as the main buffer, there is no need for the POS terminal 10 to send the rewrite settings file command of the printer 11, and as a result there is no need to modify the POS terminal 10 (such as modifying the program to add the ability to send a rewrite settings file command.

There are three methods, referred to below as first, second, and third methods, of setting the main buffer in this embodiment of the invention. The user can set by a specific method which of the three methods to use to set the main buffer.

Each of these three methods is described below.

First Method

The first method sets the main buffer to the buffer associated with the interface (communication unit, either the USB interface 23 or the wireless communication interface 25 in this example) that is first enabled to receive data from the connected external device (POS terminal 10 or tablet terminal 13).

In the case of the USB interface 23, enabled to receive data means that specific information is exchanged between the printer 11 and POS terminal 10 according to the USB protocol and a USB connection is established between the devices.

In the case of the wireless communication interface 25, enabled to receive data means that devices are paired according to the Bluetooth protocol and a communication link is established between the devices.

After the power turns on in the first method, the print control unit 201 monitors/checks the USB interface 23 and wireless communication interface 25 to determine if data reception has been enabled. The print control unit 201 then sets the buffer corresponding to the interface through which data reception is enabled first as the main buffer.

To set the main buffer with the first method, the user connects the POS terminal 10 to the printer 11 by the normal POS system startup process before the tablet terminal 13 connects to the printer 11. As a result, the first receive buffer 24 is set as the main buffer.

In one example of a process that connects the POS terminal 10 to the printer 11 before the tablet terminal 13, the POS terminal 10 and the printer 11 connect through a USB cable regardless of whether the printer 11 power is on or off. When the printer 11 then turns on, a USB connection is automatically established first between the POS terminal 10 and printer 11 before any wireless communication connection is attempted. As a result, the POS terminal 10 connects to the printer 11 before the tablet terminal 13, and the first receive buffer 24 is easily set as the main buffer.

The first method thus enables the user to set the first receive buffer 24 as the main buffer by the extremely simply operation of connecting the POS terminal 10 to the printer 11 before the tablet terminal 13 connects. User convenience is thus improved.

A special mechanism for setting the first receive buffer 24 as the main buffer is also not required, and increased cost can be suppressed.

Note that the first method may also be configured to set the main buffer to the buffer associated with the interface (communication unit) through which data is received first after receiving data is enabled. In this event, the user simply sends any data from the POS terminal 10 to the printer 11 and causes the printer 11 to execute any process based on the received data before the tablet terminal 13 sends data to the printer.

Second Method

The second method sets as the main buffer (i.e., the default target buffer) whichever of the first receive buffer 24 or second receive buffer 26 was previously specified (i.e., user-assigned) as the main buffer.

Any desirable method may be used to specify which buffer to set as the main buffer. For example, the buffer can be specified by operating a operating switch or DIP switch of the printer 11, or by connecting an external device and outputting a specific command from the external device. If the buffer is specified by a command, the buffer specification is stored in the storage unit 22. After the power turns on, the buffer specification is read and the specified buffer set as the main buffer.

In the second method, after the power turns on, the print control unit 201 sets whichever of the first receive buffer 24 or second receive buffer 26 is specified as the main buffer (in storage unit 22).

To set the main buffer with the second method, the user may simply specify the first receive buffer as the main buffer. As a result, the first receive buffer 24 is set as the main buffer.

With the second method the user does not need to perform an operation related to setting the main buffer each time the power turns on. User convenience is thus improved.

A special mechanism for setting the first receive buffer 24 as the main buffer is also not required after it has been set once, and increased cost can be suppressed.

Third Method

The third method sets the receive buffer associated with the interface that receives data through a wired communication connection as the main buffer when there are two interfaces: one that receives data from external devices by wired communication, and one that receives data from external devices by wireless communication.

In this example, the USB interface 23 receives data by wired communication, and the wireless communication interface 25 receives data by wireless communication. As a result, after the power turns on, the print control unit 201 in this third method sets the first receive buffer 24, which is the buffer linked to the USB interface 23, as the main buffer.

To set the main buffer by the third method, the user connects the POS terminal 10 to the printer 11 by wire, and connects the tablet terminal 13 to the printer 11 wirelessly. As a result, the first receive buffer 24 can be set as the main buffer.

In the third method, the user can set the first receive buffer 24 as the main buffer by the extremely simple operation of connecting the POS terminal 10 to the printer 11 by wire, and connecting the tablet terminal 13 to the printer 11 wirelessly. User convenience is thus improved.

A special mechanism for setting the first receive buffer 24 as the main buffer is also not required, and increased cost can be suppressed.

The first, second, and third methods of setting the main buffer are thus described above.

Irrespective of which of the first, second, or third method the set main buffer process SE1 uses to set the main buffer, after the set main buffer process SE1 ends, the target buffer is set to whichever receive buffer (i.e., first receive buffer 24 or second receive buffer 26) stores (i.e., holds) received data (either received from the POS terminal 10 or from the tablet terminal 13).

For ease of discussion, the following discussion assumes that in step SE1, the first receive buffer 24 is set as the main buffer.

As shown in FIG. 5, while processing data received from the POS terminal 10 and stored in the first receive buffer 24, the print control unit 201 watches whether or not order ticket print data is received from the tablet terminal 13 and the received order ticket print data is stored in the second receive buffer 26 (step SE2). As described above, when order ticket print data is received, the wireless communication interface 25 sequentially stores the received order ticket print data in the second receive buffer 26.

The print control unit 201 monitors the state of the first receive buffer 24 and second receive buffer 26 and can detect when new data is stored in either receive buffer.

When order ticket print data is stored in the second receive buffer 26 (step SE2:YES), the print control unit 201 determines whether or not all of the receipt print data stored in the first receive buffer 24 has been read, and whether all processing based on all of the receipt print data (producing a receipt) has ended (step SE3). Processing having ended includes the print control unit 201 ending control of the print unit 21 based on data stored in the first receive buffer 24.

If processing based on all receipt print data stored in the first receive buffer 24 is not completed (step SE3: NO), the print control unit 201 goes to step SE17. Step SE17 is described further below.

If processing based on all receipt print data stored in the first receive buffer 24 is completed (step SE3: YES), the print control unit 201 determines if a previously set first specific time has passed since the process ended (step SE4). The print control unit 201 has a clock function for counting the time past after processing ends when the last process based on the receipt print data has ended. In step SE4, the print control unit 201 compares the elapsed time with the previously set first specific time, and determines whether or not the previously set first specific time has passed since the process ended.

If the first specific time has already past (step SE4: YES), the print control unit 201 goes to step SE7. As will be understood below, the print control unit 201 immediately changes the target buffer from the first receive buffer 24 to the second receive buffer 26.

If the first specific time has not past (step SE4: NO), the print control unit 201 monitors if new receipt print data has been received from the POS terminal 10 and the received new receipt print data is stored in the first receive buffer 24 (step SE5) while continuing to monitor if the first specific time has past since the last process based on the receipt print data stored in the first receive buffer 24 ended (step SE6).

If newly received receipt print data is stored in the first receive buffer 24 before the specific time passes, i.e., elapses, (step SE5: YES), the print control unit 201 goes to step SE17. In this case, as will be understood below, the print control unit 201 does not change the receive buffer used as the target buffer so the new receipt print data stored in the first receive buffer 24 can be processed. That is, receipt print data stored in the first receive buffer 24 is given a higher processing priority than order ticket print data stored in the second receive buffer 26.

If the first specific time passes before new receipt print data is received (step SE4:YES or step SE6: YES), the print control unit 201 goes to step SE7.

In step SE7, the print control unit 201 switches the receive buffer used as the target buffer from the first receive buffer 24 to the second receive buffer 26.

Switching the receive buffer used as the target buffer means changing the receive buffer from which data is read, from one receive buffer to the other receive buffer. When the first receive buffer 24 is the target buffer, the print control unit 201 reads and processes data (receipt print data) from the first receive buffer 24. When the second receive buffer 26 is the target buffer, the print control unit 201 reads and processes data (order ticket print data) from the second receive buffer 26.

Why the buffer is changed after waiting a specific time after processing data stored in the first receive buffer 24 is completed is described next.

As described above, the receipt print data is data containing multiple control commands. There may therefore be a time lag between when the first control command is stored in the first receive buffer 24 and when the next control command after the first control command is stored in the first receive buffer 24. The control commands contained in the receipt print data for producing one receipt must be executed in a single continuous operation. If the commands are not executed in a single continuous operation, the receipt may not be produced correctly. The target buffer designation is therefore changed after waiting a specific time after processing based on the data stored in the first receive buffer 24 ends so that any control commands contained in the receipt print data for producing one receipt may be executed continuously even if there is a time lag in the timing in the storing of the control commands contained in the receipt print data into the first receive buffer 24.

After switching the target buffer in step SE7 from the first receive buffer 24 to the second receive buffer 26, the print control unit 201 stores a copy of the settings file SF (e.g. image layout settings) into a specific storage area (step SE8). The operation of step SE8 is equivalent to saving the settings file SF.

Next, the print control unit 201 resets the image settings of the settings file SF (step SE9). Resetting the image settings means setting the value of each parameter in the image settings to their default value.

Next, the print control unit 201 reads the rewrite settings file command, which is the first control command, from the control commands contained in the order ticket print data stored in the second receive buffer 26 (step SE10).

The rewrite settings file command is a control command for optionally rewriting the image settings stored in the settings file SF. Rewriting the image settings means setting each of the parameters in the image settings to a specific value. The rewrite settings file command contains information indicating each parameter in the image settings and the value set for each parameter. The information indicating the combinations of parameters and values are previously registered in the tablet terminal 13 by a specific method. When generating order ticket print data, the tablet terminal 13 generates a rewrite settings file command based on the registered information.

Next, the print control unit 201 executes the rewrite settings file command that was read, and rewrites the image settings in the settings file SF (step SE11).

The image settings of the settings file SF are thus reset when changing the target buffer from the first receive buffer 24 to the second receive buffer 26 in this example. The image settings are then rewritten based on the rewrite settings file command contained in the order ticket print data stored in the second receive buffer 26. As a result, the content of the image settings can be changed appropriately to an order ticket.

When changing the target buffer from the first receive buffer 24 to the second receive buffer 26 in this example, the operating settings recorded in the settings file SF are not reset and cannot be rewritten by the rewrite settings file command. The reason why is described below.

As described above, the operating settings are settings such as the print density and printing speed that affect the operation of the printer 11 when executing the printing process. As a result, the operating settings are typically set appropriately to the individual differences between printers 11 and the actual business operations of the restaurant T based on such feedback as the actual printout when producing a receipt. The operating settings therefore preferably do not change according to the type of ticket produced, and the same information is used regardless of the type of ticket produced.

Note that when a control command for rewriting the operating settings is contained in the rewrite settings file command, the print control unit 201 discards the control command for rewriting the operating settings without executing that control command. This prevents rewriting the operating settings when changing the target buffer.

After rewriting the image settings, the print control unit 201 finishes processes the order ticket print data stored in the second receiver buffer, i.e., the print control unit 201 controls the print unit 21 and causes the print unit 21 to produce an order ticket by referencing the settings file SF and sequentially reading and executing the control commands contained in the order ticket print data stored in the second receive buffer 26 (step SE12).

After all order ticket print data has been read and the process of producing an order ticket based on the order ticket print data ends, the print control unit 201 monitors whether or not new order ticket print data is received from the tablet terminal 13 and the received order ticket print data is stored in the second receive buffer 26 (step SE13) while monitoring if a second specific time has past since the order ticket printing process ended (step SE14).

This second specific time may be the same as the first specific time described above or different.

If new order ticket print data is received and stored in the second receive buffer 26 before the second specific time passes (step SE13: YES), the print control unit 201 returns to step SE10, rewrites the settings file SF based on the rewrite settings file command, and produces a new order ticket based on the new order ticket print data.

If the second specific time passes without receiving new order ticket print data (step SE14: YES), the print control unit 201 goes to step SE15.

In step SE15, the print control unit 201 overwrites the settings file SF based on the copy of the settings file SF stored in the specific storage area (that is, restores the settings file SF).

As a result of this step SE15, the settings file SF is restored to the state before the target buffer was changed from the first receive buffer 24 to the second receive buffer 26 in step SE7.

After restoring the settings file SF, the print control unit 201 changes the target buffer from the second receive buffer 26 to the first receive buffer 24 (step SE16), and returns to step SE2 to monitor for new data being written into second receiver buffer 26.

In step SE17, the print control unit 201 executes the following process. That is, the print control unit 201 references the settings file SF, and runs a process (producing a receipt) based on the data (receipt print data) stored in the first receive buffer 24 (step SE17).

After executing the process based on the receipt print data, the print control unit 201 monitors if the first specific time has past since the process ended (step SE19) while checking if new receipt print data was received from the POS terminal 10 and the received receipt print data was stored in the first receive buffer 24 (step SE18).

If newly received receipt print data is stored in the first receive buffer 24 before the first specific time passes (step SE18: YES), the print control unit 201 goes to step SE17 and executes a process based on the newly received receipt print data.

If the first specific time passes without receiving new receipt print data (step SE19: YES), the print control unit 201 goes to step SE7. As described above, the target buffer changes from the first receive buffer 24 to the second receive buffer 26 as a result of step SE7, processing continues based on the data stored in the second receive buffer 26.

As described above, the printer 11 executes the process described with reference to the flow chart in FIG. 5 without changing the data (receipt print data) sent from the POS terminal 10 to the printer 11. As a result, there is no need to modify the POS terminal 10 (such as modify the installed POS application or the printer driver program).

Furthermore, the print control unit 201 of the printer 11 buffers without processing order ticket print data received from the tablet terminal 13, and then changes the target buffer from the first receive buffer 24 to the second receive buffer 26 when a specific time has past after processing based on the receipt print data received from the POS terminal 10 ends. The print control unit 201 then executes the process of producing an order ticket based on the order ticket print data. After printing the order ticket, the print control unit 201 changes the target buffer from the second receive buffer 26 to the first receive buffer 24. As a result, receipts can be printed normally by the printer 11 as controlled by the POS terminal 10 while order tickets can also be printed by the printer 11 as controlled by the tablet terminal 13.

The print control unit 201 also saves the settings file SF when changing the target buffer from the first receive buffer 24 to the second receive buffer 26 (but preferably does not save the settings file SF when changing the target buffer from the second receive buffer 26 to the first receive buffer 24), and restores the settings file SF when resetting the target buffer (i.e., switching back) from the second receive buffer 26 to the first receive buffer 24. When executing a process based on the order ticket print data stored in the second receive buffer 26, the print control unit 201 first rewrites the content of the settings file SF based on the rewrite settings file command contained in the order ticket print data. As a result, the print control unit 201 can control printing using a receipt layout when printing a receipt, and can control printing using an order ticket layout when printing an order ticket.

Furthermore, the print control unit 201 in this embodiment of the invention operates according to the same processing program instead of using a different processing program for each communication interface (USB interface 23, wireless communication interface 25), and processes received data appropriately to the communication interface through which the data is received. There is, therefore, no need to write a processing program for each communication interface, and storage resources and computing resources can be used effectively.

This embodiment of the invention also does not store a settings file SF for each communication interface, and instead switches and uses a single settings file SF as needed. Storage resources can therefore be used effectively.

Another function of the print control unit 201 is described next.

Figure 6:
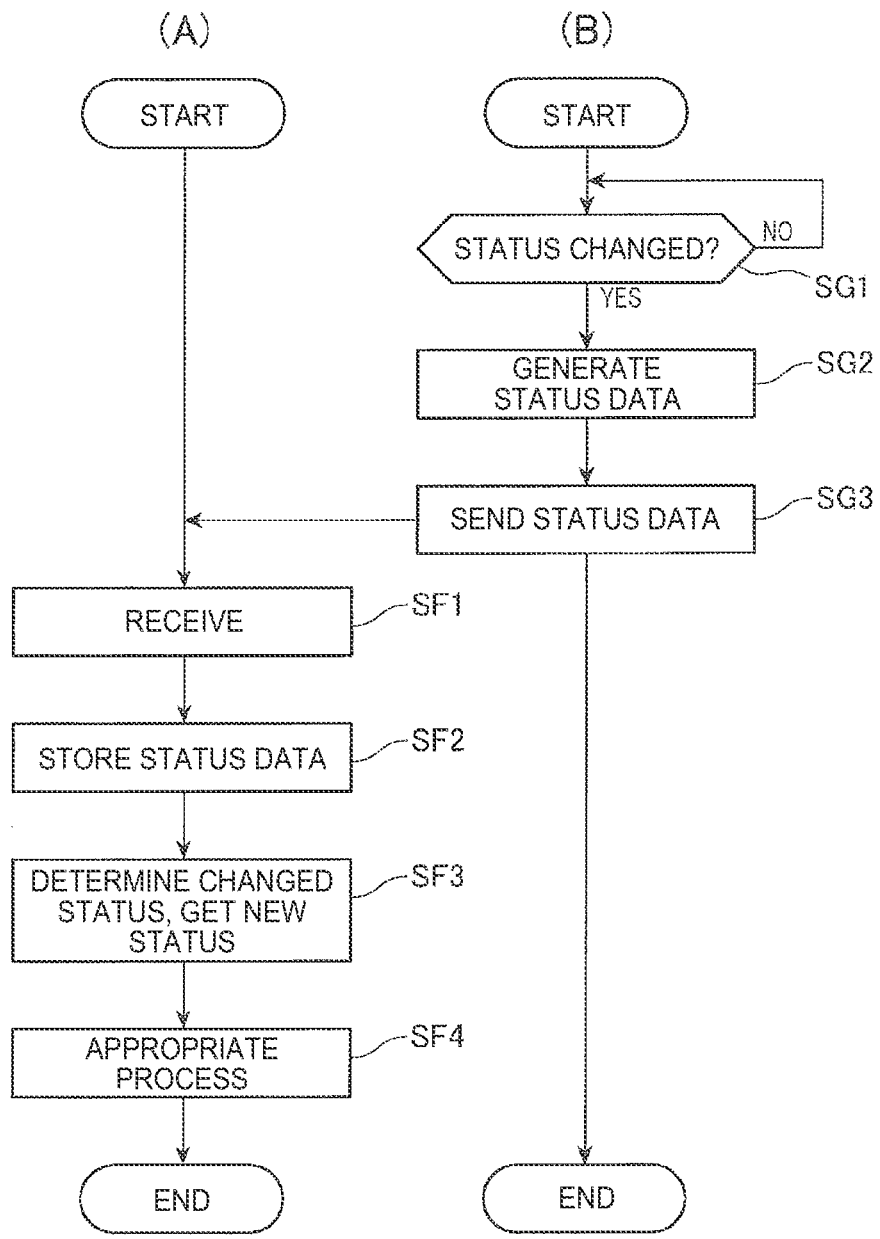
FIG. 6 is a flow chart showing an operation of the POS terminal and the printing device in accord with the present invention.

FIG. 6 is a flow chart describing the operation of the POS terminal 10 and the printer 11. In FIG. 6, column (A) shows the operation of the POS terminal control unit 30 of the POS terminal 10, and column (B) shows the operation of the print control unit 201 of the printer 11.

As shown in FIG. 6, column (B), the print control unit 201 of the printer 11 monitors if there is a change in the status of the printer 11 (step SG1).

The status in this example refers to a specific state of the printer 11.

The status in this example is the state (open or closed) of the cover (not shown in the figure) of the printer 11. The cover changing from open to closed, or from closed to open, is a change in status. When the cover is open, the printer 11 cannot print. While not shown in the figures, the printer 11 has a sensor that outputs a different value when the cover is open and than when the cover is closed, and the print control unit 201 detects the status of the cover of the printer 11 based on the output from this sensor.

In another example, the status is the error state of the print unit 21. The error state of the print unit 21 is a print error state indicating that an error occurred, or a no-print error state indicating that an error has not occurred. A change from the print error state to the no-print error state, and a change from the no-print error state to the print error state, are changes in the printer status. The printer 11 cannot print while in the print error state. While not shown in the figures, the print control unit 201 can detect the error state of the print unit 21 based on an input from a specific sensor or by another method.

Another example of the printer status in this embodiment is the state of the roll paper stored in the printer 11. The state of the roll paper is a no-paper state, a near-end state indicating there is little roll paper left, and a normal roll paper state indicating there is sufficient roll paper (there is more roll paper than in the near-end state). A change from the normal roll paper state to the near-end state or no-paper state, and a change from the near-end state to the no-paper state, are changes in printer status. Preferably, the printer 11 cannot print while in the near-end state or in the no-paper state. While not shown in the figures, the printer 11 has a sensor that outputs different values when the state of the roll paper is the near-end state or the no-paper state, and when the state of the roll paper is the normal roll paper state. The print control unit 201 can detect the state of the roll paper based on output from this sensor.

Three examples of the printer status are described above, but the printer status is not limited thereto. The status may change according to the change in output from sensors included in the printer 11.

When in step SG1 a change in status is detected (step SG1: YES), the print control unit 201 generates status data indicating the status that changed (step SG2).

Figure 7:
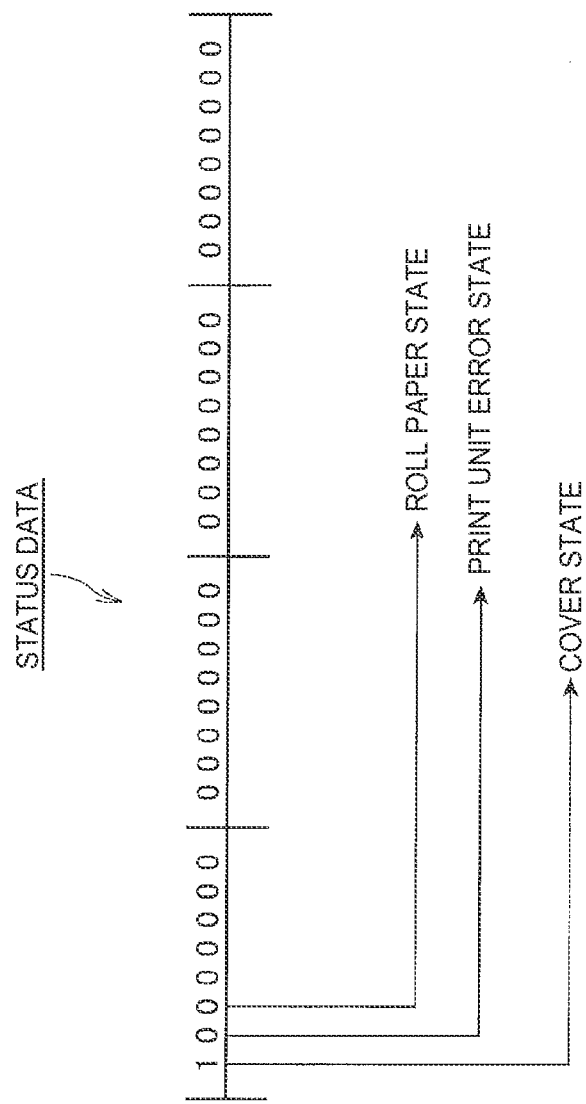
FIG. 7 shows an example of status data.

FIG. 7 shows an example of the structure of status data.

As shown in FIG. 7, the status data is preferably 4 bytes (32 bits) long.

Each bit in the status data functions as a flag representing a specific status.

In the example shown in FIG. 7, bit 1 in the status data is a flag representing the state of the cover, and is set to 1 when the cover is open, and 0 when the cover is closed.

Bit 2 in the status data is a flag representing the error state of the print unit 21, and is set to 1 when a print error occurs, and is set to 0 when there is no print error.

Bit 3 in the status data is a flag representing the roll paper state, and is set to 1 in the near-end state, and set to 0 in the normal paper state.

In step SG2, the print control unit 201 acquires the status information, and based on the acquired status information generates status data in which the value of each bit expresses the state of the corresponding status parameter. As a result, the bit corresponding to a status that changed takes the value indicating the status after the change in the status data gated in step SG2. For example, when it is detected in step SG1 that the state of the cover changed from closed to open, in step SG2 the print control unit 201 generates status data in which the value of bit 1 is 1 (and the other bits are set to values indicating the status corresponding to that bit).

After generating the status data, the print control unit 201 controls the USB interface 23 to send the status data to the POS terminal 10 (step SG3).

The print control unit 201 in this embodiment of the invention thus sends the status data to the POS terminal 10 and does not send it to the tablet terminal 13. The effect of this is described below.

Also in this case the printer 11 automatically sends the status data to the POS terminal 10 when a status change is detected even if a request for status data has not been sent from the POS terminal 10 to the printer 11. In other words, the printer 11 has a so-called auto-status-back. There is also a configuration command that controls whether or not to use this function, and the printer 11 can receive this configuration command from the POS terminal 10 and set whether or not to use the auto-status-back.

As shown in FIG. 6, column (A), the POS terminal control unit 30 of the POS terminal 10 controls the POS terminal communication interface 32 to receive the status data (step SF1).

Next, the POS terminal control unit 30 stores the received status data as newest status data in a specific storage area in the POS terminal storage unit 31 (step SF2). In conjunction with this step SF2, the POS terminal control unit 30 manages the status data stored as the newest status data before receiving status data in step SF1 as the last status data received before receiving the newest status data.

Note that below the newest status data received in step SF1 is referred to as the newest status data. The status data managed as the last status data received before receiving the newest status data is referred to as the old status data.

The POS terminal control unit 30 in this embodiment of the invention thus stores both the newest status data and old status data.

Next, the POS terminal control unit 30 determines what status changed and acquires the changed status (the new status) (step SF3).

More specifically, the POS terminal control unit 30 determines the logic exclusive OR function of the newest status data and the old status data to identify changes in state, and determines the status corresponding to any bit whose exclusive OR function is 1, which indicates a changed in the bit. The POS terminal control unit 30 also acquires the status after the change based on the newest status data. For example, when the cover changes from closed to open, the POS terminal control unit 30 in step SF3 determines that the state of the cover changed and that the changed state of the cover is open.

Next, the POS terminal control unit 30 executes a process appropriate to the new status acquired in step SF3 (step SF4).

The process to execute is predetermined relationally to the changed status, and the POS terminal control unit 30 executes the process appropriate to the new (changed) status.

For example, if the state of the roll paper changes from the normal paper state to the near-end state, the POS terminal control unit 30 controls the POS terminal display unit 36 to display a prompt to replace the roll paper.

As described above, the print control unit 201 in this embodiment of the invention sends the status data to the POS terminal 10 and not to the tablet terminal 13.

The effect of this is described below.

As described above, the POS terminal control unit 30 of the POS terminal 10 determines (based on a comparison of the newest status data and the old status data) if there was a change in the status of the printer 11, and the new status after the change. Comparing the newest status data and the old status data based on status data with a data structure such as shown in FIG. 7 is therefore required to acquire information related to the status of the printer 11.

As also described above, the POS terminal 10 is continuously connected to the printer 11. The POS terminal 10 can therefore continuously receive all status data sent by the printer 11 while the POS terminal and printer are on. As a result, the POS terminal 10 can know that the status of the printer 11 changed and the new status after the status change based on the status data.

The tablet terminal 13, however, connects only temporarily to the printer 11. Therefore any tablet terminal 13 that is not currently connected to the printer when a new printer status is issued would not receive the new printer status data sent by the printer 11. There is therefore little need for the tablet terminal 13 to acquire the status data if the status changed or the change in the status.

As a result, the printer 11 sends status data to the POS terminal 10, but does not send status data to the tablet terminal 13. Transmission of unnecessary data can therefore be prevented, communication efficiency improved, and processing efficiency improved. The tablet terminal 13 also does not need the ability to receive and process status data, including extracting status data from the received data and reading and discarding the extracted data. Therefore processing efficiency is improved, and program development is simplified.

As described above, a printing system 1 according to the embodiment of the invention described above includes a POS terminal 10, a tablet terminal 13 (control device), and a printer 11.

The POS terminal 10 sends receipt print data (data) for producing receipts.

The tablet terminal 13 sends order ticket print data (data) for printing order tickets (tickets) printed with the names of ordered items and the ordered quantities (specific information).

The printer 11 includes a print unit 21 that prints on roll paper (recording media) and cuts the roll paper to produce receipts or order tickets; a USB interface 23 (first communication unit) that receives receipt print data from the POS terminal 10; a first receive buffer 24 that stores the receipt print data received through the USB interface 23; a wireless communication interface 25 that receives order ticket print data from the tablet terminal 13; a second receive buffer 26 that stores the order ticket print data received through the wireless communication interface 25; and a print control unit 201 that sets the target buffer to either the first receive buffer 24 or the second receive buffer 26 and controls the print unit 21 based on the data stored in the target buffer, switches the target buffer from the first receive buffer 24 to the second receive buffer 26 when control of the print unit 21 based on the receipt print data stored in the first receive buffer 24 is in a specific control state, and switches the target buffer to the first receive buffer 24 when control of the print unit 21 based on data stored in the second receive buffer 26 ends.

Thus comprised, the printer 11 can switch processing between data received from the POS terminal 10 and data received from the tablet terminal 13 without requiring a processing program for each communication interface. More specifically, the printer 11 and printing system 1 can execute processes appropriate to a configuration having multiple communication interfaces (communication units) and effectively use resources.

In another example, when order ticket print data is stored in the second receive buffer 26, the print control unit 201 of the printer 11 switches the target buffer to the second receive buffer 26 when a first specific time (specific time) has past after control of the print unit 21 based on receipt print data stored in the first receive buffer 24 ends.

This configuration enables changing the target buffer from the first receive buffer 24 to the second receive buffer 26 after producing a receipt based on receipt print data is reliably completed.

In another example, the print control unit 201 switches the target buffer between the first receive buffer 24 and the second receive buffer 26, controls the print unit 21 based on data stored in the buffer set as the target buffer, resets the image settings of the settings file SF when the target buffer changes from the first receive buffer 24 to the second receive buffer 26, and restores the original settings file SF when the target buffer changes from the second receive buffer 26 to the first receive buffer 24.

This configuration enables the print control unit 201 to control printing using a layout appropriate to a receipt based on the settings file SF when producing a receipt. More particularly, because a single settings file SF is changed as needed for use instead of storing a separate settings file SF for each communication interface, storage resources can be used efficiently. More specifically, the printer 11 and printing system 1 can use resources efficiently to run a process appropriate to a configuration having multiple communication interfaces (communication units).

In another example, a rewrite settings file command is contained in the order ticket print data. The print control unit 201 rewrites the settings file SF based on the rewrite settings file command contained in the order ticket print data stored in the second receive buffer 26 after changing the target buffer from the first receive buffer 24 to the second receive buffer 26, and controls the print unit 21 based on the order ticket print data stored in the second receive buffer 26 using the modified settings file SF.

This configuration enables the print control unit 201 to control printing using a receipt layout when printing a receipt and using an order ticket layout when printing an order ticket based on the settings file SF.

In another example, the settings file SF contains image settings related to the image printed on roll paper, and operating settings related to the printer operation when printing on roll paper.

The print control unit 201 rewrites the image settings of the settings file SF based on the rewrite settings file command, but does not rewrite the operating settings.

Thus comprised, the print control unit 201 can produce receipts and produce order tickets based on the same operating settings.

In another example, the USB interface 23 of the printer 11 receives receipt print data from the POS terminal 10 by wired communication. The wireless communication interface 25 of the printer 11 receives order ticket print data from the tablet terminal 13 by wireless communication.

Thus comprised, the printer 11 can remain able to produce receipts based on control by the POS terminal 10 through a wired connection, and can appropriately produce order tickets based on control by the tablet terminal 13 through a wireless connection.

As described above, a printing system 1 according to one embodiment of the invention includes a printer 11, a POS terminal 10 connected continuously to the printer 11, and a tablet terminal 13 (control device) that connects temporarily to the printer 11.

The POS terminal 10 transmits receipt print data (data) for printing receipts to the printer 11.

The tablet terminal 13 transmits order ticket print data (data) for printing order tickets (tickets printed with specific information).

The printer 11 includes a print unit 21 that prints on roll paper (recording media); a USB interface 23 (first communication unit) that exchanges data with the POS terminal 10; a wireless communication interface 25 (second communication unit) that exchanges data with the tablet terminal 13; and a print control unit 201 that controls the print unit 21 based on data received by the USB interface 23 or wireless communication interface 25, monitors if there is a change in the status of the print unit 21, and if a status change is detected, generates status data indicating the status that changed and outputs the generated status data through the USB interface 23.

Thus comprised, the printer 11 can suppress transmission of unnecessary data by not sending the status data to the tablet terminal 13, and thereby improve communication efficiency, improve processing efficiency, and improve the ease of program development as described above. More specifically, the printer 11 can execute a process compatible with configurations having a plurality of interfaces (communication units).

In another example, when status data is received from the printer 11, the POS terminal 10 acquires what printer state has changed based on the newest status data received and the last status data received before the newest status data.

Thus comprised, the POS terminal 10 can use the status data to appropriately determine if there is a change in a particular printer 11 status and the new printer status.

In another example, the printer 11 has a first receive buffer 24 that stores data received by the USB interface 23, and a second receive buffer 26 that stores data received by the wireless communication interface 25. The print control unit 201 of the printer 11 switches the target buffer between the first receive buffer 24 and second receive buffer 26, and controls the print unit 21 based on the data stored in the buffer used as the target buffer.

By thus switching the buffer used as the target buffer for data processing, the printer 11 can switch between a process based on data received from the POS terminal 10 and a process based on data received from the tablet terminal 13.

In another example, the POS terminal 10 communicates with the printer 11 through a wired connection, and the tablet terminal 13 communicates with the printer 11 through a wireless connection.

Thus comprised, the printer 11 sends status data to the POS terminal 10 that is continuously connected to the printer 11 by wire, and does not send status data to the tablet terminal 13 that connects temporarily wirelessly. Transmission of unnecessary data can therefore be suppressed, and as described above communication efficiency can be improved, processing efficiency can be improved, and program development can be simplified.

As described above, a printer 11 according to another embodiment of the invention has a print unit 21 that prints on print media; a USB interface 23 (first communication unit) that receives data; a first receive buffer 24 that stores data received by the USB interface 23; a wireless communication interface 25 (second communication unit) that receives data; and a second receive buffer 26 that stores data received by the wireless communication interface 25.

In specific circumstances, the print control unit 201 sets the first receive buffer 24 or the second receive buffer 26 as the main buffer; keeps the main buffer as the target buffer when data is not stored in a secondary buffer, which is the buffer that is not the main buffer; and when data is stored in the secondary buffer, changes the target buffer to the secondary buffer, runs a process based on the data in the secondary buffer, and when this process ends resets the target buffer to the main buffer.

Thus comprised, when data is stored in the secondary buffer, the printer 11 can execute processes based on the data in the secondary buffer while remaining able to execute processes based on data stored in the main buffer. More specifically, the printer 11 can execute a process appropriate to a configuration having multiple interfaces (communication units).

In a first method according to another example, the print control unit 201 sets whichever of the USB interface 23 and the wireless communication interface 25 is first able to receive data as the main buffer.

Thus comprised, to set the buffer that receives data from the POS terminal 10 as the main buffer, the user can set the first receive buffer 24 as the main buffer by the extremely simple operation of connecting the printer 11 to the POS terminal 10 before connecting the tablet terminal 13. User convenience is thus improved. A special mechanism for setting the first receive buffer 24 as the main buffer is also not required, and increased cost can be suppressed.

Note that in the first method, the print control unit 201 may alternatively set the buffer associated with the interface (communication unit) that receives data first as the main buffer.

In a second method according to another example, the print control unit 201 sets whichever of the first receive buffer 24 and the second receive buffer 26 is selected by the user as the main buffer.

Thus comprised, when the buffer that stores data received from the POS terminal 10 is set as the main buffer, the user does not need to perform a task related to setting the main buffer each time the power turns on. User convenience is thus improved. A special mechanism for setting the first receive buffer 24 as the main buffer is also not required, and increased cost can be suppressed.

In a third method according to another example, when one interface, such as a USB interface 23, receives data by wired communication, and the other interface, such as the wireless communication interface 25, receives data by wireless communication, the print control unit 201 sets the buffer related to the interface that receives data by wired communication as the main buffer.

Thus comprised, to set the buffer that stores data received from the POS terminal 10 as the main buffer, the user can set the first receive buffer 24 as the main buffer by the extremely simple task of connecting the POS terminal 10 to the printer 11 by wire, and connecting the tablet terminal 13 to the tablet terminal 13 wirelessly. User convenience is thus improved. A special mechanism for setting the first receive buffer 24 as the main buffer is also not required, and increased cost can be suppressed.

Other Examples

Another example of the invention is described below.

When the target buffer is set to the first receive buffer 24 in the embodiment described above, the print control unit 201 changes the buffer when order ticket print data is received from the tablet terminal 13 after waiting a first specific time from when processing all receipt print data stored in the first receive buffer 24 ends.

However, when a specific type of control command is the last control command processed in the control commands contained in the receipt print data for one receipt, the print control unit 201 may immediately switch the buffer after executing the control command of the specific type instead of waiting for the specific time to pass.

Examples of such specific types of control commands include a cut command instructing cutting the roll paper after printing a receipt, and a FF (form feed) command instructing printing in a page mode. When a cash drawer KS is connected to the printer 11, a command for driving the cash drawer KS is received from the POS terminal 10 and the POS terminal 10 drives the cash drawer KS. Such commands indicating the end of the process may be used as specific commands for switching the buffer.

This configuration enables changing the buffer after executing the control commands contained in receipt print data for producing one receipt in a single continuous process. Because this configuration enables switching the buffer without waiting a specific time, processing efficiency is improved and the time required to complete the process can be shortened.

The invention is described above with reference to a preferred embodiment thereof, but the invention is not limited thereto and can be modified and adapted in many ways without departing from the scope of the accompanying claims.

The examples described above have two communication interfaces, a USB interface 23 and a wireless communication interface 25. The number of communication interfaces in the printer 11 is not limited to two, however, and the printer may have three or more communication interfaces.

The communication protocols of the communication interfaces are also not limited to USB and Bluetooth, and Ethernet (R) or a serial communication protocol such as RS-232C may be used.

Furthermore, the printing system 1 in the foregoing embodiments products order tickets in response to requests from the tablet terminal 13, but the printouts the printer 11 produces in response to requests from devices other than the POS terminal 10 are obviously not limited to order tickets, and may be tickets printed with a queuing number or coupons, for example.

The printing system 1 deployed in a restaurant T is described in the foregoing embodiments, but the printing system 1 is obviously not limited to use in restaurants T.

The foregoing embodiments also describe rewriting only the image settings recorded in the settings file SF when the target buffer changes, but configurations that also change the operating settings are also conceivable.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method of a printing device, comprising:
   using a print mechanism to print on recording media;
   using a first communication interface to receive first print data, and to store the received first print data into a first receive buffer;
   using a second communication interface to receive second print data, and to store the received second print data into a second receive buffer;
   using a print control processor to control the print mechanism to print based on print data stored in a designated target buffer;
   wherein:
      one of the first receive buffer and second receive buffer is alternately designated as the target buffer;
      if the first received buffer is currently designated as the target buffer, then changing the target buffer designation from the first receive buffer to the second receive buffer when control of the print mechanism based on first print data stored in the first receive buffer reaches a specific control state,
      if the first receive buffer is currently designated as the target buffer and second print data is stored to the second receive buffer, then changing the target buffer designation to the second receive buffer after the elapse of a predefined non-zero wait period that follows after control of the print mechanism based on first print data stored in the first receive buffer ends, and
      if the second receive buffer is currently designated as the target buffer, then resetting the target buffer designation to the first receive buffer, irrespective of whether the first buffer contains print data, in response to control of the print mechanism based on second print data stored in the second receive buffer ending.

2. The control method of a printing device described in claim 1, further comprising:
   if the first receive buffer is currently designated as the target buffer and second print data containing plural commands is stored to the second receive buffer, then changing the target buffer designation to the second receive buffer after control of the printing device based on a specific non-print-related command included in the first print data stored in the first receive buffer ends.

3. The control method of a printing device described in claim 1, further comprising:

monitoring if there is a status change in the printing device;

generating status data including the status that changed when there is a status change; and if the first communication interface and the second communication interface are both actively coupled to respective external devices, then sending the generated status data to only one of the first communication interface or the second communication interface for transmission to one respective external device.

4. The control method of a printing device described in claim 1, further comprising:

if the first receive buffer is currently designated as the target buffer and second print data containing plural commands is stored to the second receive buffer, then changing the target buffer designation to the second receive buffer after control of print mechanism based on all contents of the first print data stored in the first receive buffer ends.

5. The control method of a printing device described in claim 1, wherein one of the first communication interface and second communication interface is configured to start receiving print data first upon the printing device turning on, said method further comprising:

designating as the target buffer the receive buffer corresponding to the first or second communication interface that is configured to start receiving print data first upon the printing device turning on.

6. The control method of a printing device described in claim 1, wherein one of the first communication interface has a higher priority than the second communication interface, said method further comprising:

designating as the target buffer the first buffer corresponding to higher priority first communication interface, and designating the second buffer a priority lower than the first buffer.

7. The control method of a printing device described in claim further comprising:

upon the printing device turning on, designating as the target buffer the receive buffer corresponding to whichever of the first Communication interface and second communication interface first receives a communication request.

8. The control method of a printing device described in claim 1, wherein one of the first communication interface and second communication interface is a wired communication interface and the other communication interface is a wireless communication interface, said method further comprising:

designating the receive buffer corresponding to the communication interface that is a wired communication interface as the target buffer.

9. The control method of a printing device described in claim 1, wherein:

the first receive buffer has a designated first printer settings file;

the method further comprising:

controlling the print mechanism, using the first printer setting file and the contents of the first receive buffer when the first receive buffer is designated as the target buffer;

in response to the target buffer designation changing from the first receive buffer to the second receive buffer, saving the first printer settings file, and accessing a default second printer settings file different from the first printer settings file;

controlling the print mechanism using a printer settings file indicated by the second receive buffer when the second receive buffer is designated as the target buffer; and replacing the default second printer settings file with the saved first printer settings file when the target buffer designation changes from the second receive buffer to the first receive buffer.

10. The control method of a printing device described in claim 9, wherein the second print data that the second receive buffer receives includes a rewrite-settings-file command to rewrite the default second printer settings file with a third printer settings file different from the first printer settings file, said control method further comprising:

rewriting the default second printer settings file based on the rewrite-settings-file command when the target buffer changes from the first receive buffer to the second receive buffer, and controlling the print mechanism based on print data stored in the second receive buffer using the third printer settings file.

11. The control method of a printing device described in claim 1, wherein the printing device includes a drawer, the control method further comprising:

if the first receive buffer is currently designated as the target buffer and second print data containing plural commands is stored to the second receive buffer, then changing the target buffer designation to the second receive buffer after control of the printing device based on an open-drawer command included in the first print data stored in the first receive buffer ends.

12. A control method of a printing system, comprising:

using a point-of-sale (POS) terminal to send first print data for producing a receipt to a printing device;

using a control device to send second print data for producing a ticket printed with specific information to the printing device;

the printing device having a print mechanism to print on a recording medium, a cutter to cut the recording medium to produce the receipt or the ticket, a first communication interface to exchange print data with the POS terminal, a first receive buffer configured to store first print data received by the first communication interface and a designated first printer settings file, a second communication interface to exchange data print data the control device, and a second receive buffer configured to store second print data received by the second communication interface;

wherein the printing device controls the print mechanism based on print data stored in a designated target buffer, and one of the first receive buffer and second receive buffer is alternately designated as the target buffer; and wherein the control method comprises the printing device implementing processes that comprise the following steps:

if the first received buffer is currently designated as the target buffer, then changing the target buffer designation from the first receive buffer to the second receive buffer when control of the print mechanism based on first print data stored in the first receive buffer goes to a specific control state;

if the second receive buffer is currently designated as the target buffer, then resetting the target buffer designation to the first receive buffer, irrespective of whether the first buffer contains print data, in response to control of the print mechanism based on second print data stored in the second receive buffer ending;

controlling the print mechanism using the first printer settings file and the contents of the first receive buffer when the first receive buffer is designated as the target buffer;

in response to the target buffer designation changing from the first receive buffer to the second receive buffer, saving the first printer settings file, and accessing a default second printer settings file different from the first printer settings file;

controlling the print mechanism using a printer settings file indicated by the second receive buffer when the second receive buffer is designated as the target buffer; and replacing the default second printer settings file with the saved first printer settings file when the target buffer designation changes from the second receive buffer to the first receive buffer.

13. The control method of a printing system described in claim 12, further comprising:

if the first receive buffer is currently designated as the target buffer and second print data is stored to the second receive buffer, then the printing device changing the target buffer designation to the second receive buffer after the elapse of a predefined non-zero wait period that follows after control of the print mechanism based on first print data stored in the first receive buffer ends.

14. The control method of a printing system described in claim 12, further comprising:

if the first receive buffer is currently designated as the target buffer and second print data containing plural commands is stored to the second receive buffer, then the printing device changing the target buffer designation to the second receive buffer after control of the printing device based on a specific non-print-related command included in the first print data stored in the first receive buffer ends.

15. The control method of a printing system described in claim 12, further comprising:

the printing device implementing processes that comprise the following steps:
monitoring if there is a status change in the printer;
generating status data including the status that changed when there is a status change; and
if the first communication interface is actively coupled to the POS terminal and the second communication interface is actively coupled to the control device, then sending the generated status data to only one of the first communication interface or the second communication interface for transmission to their respectively coupled POS terminal or control device.

16. The control method of a printing system described in claim 15, further comprising:

if the POS terminal newly receives a status data bit from the first communication interface of the printing device, the POS terminal determines a status of the printing device changed based on the newly received status data bit and a previously received status data bit.

17. The control method of a printing system described in claim 12, wherein the second print data that the second receive buffer of the printing device receives includes a rewrite-settings-file command to rewrite the default second printer settings file with a third printer settings file different from the first printer settings file, the control method further comprising the printing device implementing processes the comprise the following steps:

rewriting the default second printer settings file based on the rewrite-settings-file command when the target buffer designation changes from the first receive buffer to the second receive buffer, and controlling the print mechanism based on print data stored in the second receive buffer using the third printer settings file.

18. A printing device comprising:

a print mechanism configured to print on a recording medium;

a first communication interface configured to receive first print data, and to store the received first print data into a first receive buffer;

a second communication interface configured to receive second print data, and to store the received second print data into a second receive buffer; and a print control processor configured to control the print mechanism to print based on print data stored in a designated target buffer;

wherein the print control processor is further configured such that:

one of the first receive buffer and second receive buffer is alternately designated as the target buffer;

if the first received buffer is currently designated as the target buffer, then the target buffer designation is changed from the first receive buffer to the second receive buffer when control of the print mechanism based on first print data stored in the first receive buffer reaches a specific control state;

if the first receive buffer is currently designated as the target buffer and second print data is stored to the second receive buffer, then the target buffer designation is changed to the second receive buffer after the elapse of a predefined non-zero wait period that follows after control of the print mechanism based on first print data stored in the first receive buffer ends; and if the second receive buffer is currently designated as the target buffer, then the target buffer designation is reset to the first receive buffer, irrespective of whether the first buffer contains print data, in response to control of the print mechanism based on second print data stored in the second receive buffer ending.

19. A control method of a printing device, comprising:

using a print mechanism to print on recording media;
using a first communication interface to receive first print data, and to store the received first print data into a first receive buffer;
using a second communication interface to receive second print data, and to store the received second print data into a second receive buffer;
using a print control processor to control the print mechanism to print based on print data stored in a designated target buffer;

wherein:
one of the first receive buffer and second receive buffer is alternately designated as the target buffer,
the first receive buffer has a designated first printer settings file,
if the first received buffer is currently designated as the target buffer, then changing the target buffer designation from the first receive buffer to the second receive buffer when control of the print mechanism based on first print data stored in the first receive buffer reaches a specific control state, and if the second receive buffer is currently designated as the target buffer, then resetting the target buffer designation to the first receive buffer, irrespective of whether the first buffer contains print data, in response to control of the print mechanism based on second print data stored in the second receive buffer ending;

the method further comprising:

controlling the print mechanism using the first printer settings file and the contents of the first receive buffer when the first receive buffer is designated as the target buffer;

in response to the target buffer designation changing from the first receive buffer to the second receive buffer, saving the first printer settings file, and accessing a default second printer settings file different from the first printer settings file;

controlling the print mechanism using a printer settings file indicated by the second receive buffer when the second receive buffer is designated as the target buffer; and replacing the default second printer settings file with the saved first printer settings file when the target buffer designation changes from the second receive buffer to the first receive buffer.

20. A control method of a printing device that comprises a drawer, comprising:

using a print mechanism to print on recording media;

using a first communication interface to receive first print data, and to store the received first print data into a first receive buffer;

using a second communication interface to receive second print data, and to store the received second print data into a second receive buffer;

using a print control processor to control the print mechanism to print based on print data stored in a designated target buffer;

wherein:

one of the first receive buffer and second receive buffer is alternately designated as the target buffer;

if the first received buffer is currently designated as the target buffer, then changing the target buffer designation from the first receive buffer to the second receive buffer when control of the print mechanism based on first print data stored in the first receive buffer reaches a specific control state;

if the first receive buffer is currently designated as the target buffer and second print data containing plural commands is stored to the second receive buffer, then changing the target buffer designation to the second receive buffer after control of the printing device based on an open-drawer command included in the first print data stored in the first receive buffer ends; and if the second receive buffer is currently designated as the target buffer, then resetting the target buffer designation to the first receive buffer, irrespective of whether the first buffer contains print data, in response to control of the print mechanism based on second print data stored in the second receive buffer ending.

* * * * *